(12) United States Patent
Kasperchik et al.

(10) Patent No.: US 12,296,387 B2
(45) Date of Patent: May 13, 2025

(54) THREE-DIMENSIONAL PRINTING

(71) Applicant: PERIDOT PRINT LLC, Palo Alto, CA (US)

(72) Inventors: Vladek Kasperchik, Corvallis, OR (US); Krzysztof Nauka, Palo Alto, CA (US); Mohammed S. Shaarawi, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 189 days.

(21) Appl. No.: 17/052,860

(22) PCT Filed: Mar. 15, 2019

(86) PCT No.: PCT/US2019/022599
§ 371 (c)(1),
(2) Date: Nov. 4, 2020

(87) PCT Pub. No.: WO2020/190269
PCT Pub. Date: Sep. 24, 2020

(65) Prior Publication Data
US 2021/0402468 A1    Dec. 30, 2021

(51) Int. Cl.
*B22F 10/28* (2021.01)
*B22F 1/054* (2022.01)
(Continued)

(52) U.S. Cl.
CPC ............ *B22F 10/28* (2021.01); *B22F 1/054* (2022.01); *B22F 10/14* (2021.01); *B33Y 30/00* (2014.12);
(Continued)

(58) Field of Classification Search
CPC ............................. B23K 15/086; B28B 1/001; B22F 2003/1057
See application file for complete search history.

(56) References Cited

U.S. PATENT DOCUMENTS

2008/0182011 A1    7/2008    Ng et al.
2008/0187711 A1*   8/2008    Alam ............... B29C 64/165
                                                        106/35
(Continued)

FOREIGN PATENT DOCUMENTS

AU    199737506    *    4/1994
CN    207154779 U        3/2018
(Continued)

OTHER PUBLICATIONS

El-Wahab, H.A. et al. "Preparation and characterization of nano-copolymers based on two different surfactants and use it as a binder for surface coatings." 2018. Nanoscience and nanotechnology. 12. 2. p. 1-17. (Year: 2018).*

(Continued)

*Primary Examiner* — Nicholas A Wang
(74) *Attorney, Agent, or Firm* — HP Inc. Patent Department

(57) ABSTRACT

Described herein are kits, methods, and systems for printing metal three-dimensional objects. In an example, described is a kit for three-dimensional printing comprising: powdered metal build material; and a binding fluid comprising a liquid vehicle, metal or metal precursor particles, and latex polymer particles dispersed in the liquid vehicle, wherein the latex polymer particles have an average particle size of from about 10 nm to about 300 nm, and wherein the metal or metal precursor particles comprise metal nanoparticles, metal oxide nanoparticles, metal oxide nanoparticles and a reducing agent, or combinations thereof.

22 Claims, 8 Drawing Sheets

(51) Int. Cl.
  *B22F 10/14*   (2021.01)
  *B33Y 30/00*   (2015.01)
  *B22F 1/102*   (2022.01)
  *B22F 1/17*    (2022.01)
  *B22F 1/18*    (2022.01)
  *B33Y 10/00*   (2015.01)
  *B33Y 70/10*   (2020.01)

(52) U.S. Cl.
  CPC ............... *B22F 1/102* (2022.01); *B22F 1/17* (2022.01); *B22F 1/18* (2022.01); *B22F 2999/00* (2013.01); *B33Y 10/00* (2014.12); *B33Y 70/10* (2020.01)

(56) References Cited

U.S. PATENT DOCUMENTS

| | | | |
|---|---|---|---|
| 2008/0241404 A1* | 10/2008 | Allaman | B29C 64/357 118/308 |
| 2013/0222496 A1 | 8/2013 | Iu | |
| 2015/0035209 A1 | 2/2015 | Shah et al. | |
| 2017/0251713 A1 | 9/2017 | Warner et al. | |
| 2018/0162013 A1 | 6/2018 | Fulop et al. | |
| 2021/0071012 A1* | 3/2021 | Koning | C09D 11/104 |

FOREIGN PATENT DOCUMENTS

| | | | |
|---|---|---|---|
| EP | 1841381 B1 | | 3/2013 |
| EP | 3321002 A1 | | 5/2018 |
| JP | WO2009139393 | * | 11/2009 |
| KR | 20170116624 A | | 10/2017 |
| WO | WO2006079459 | * | 8/2006 |
| WO | WO-2007039450 A1 | | 4/2007 |

OTHER PUBLICATIONS

El-Wahab, H. et al. "Preparation and characterization of nano-copolymers based on two different surfactants and use it as a binder for surface coatings." 2018. Nanoscience and nanotechnology: an indian journal. 12. 2. p. 1-17. (Year: 2018).*

Gibson, I. et al. "Additive manufacturing technologies." 2010. Springer. (Year: 2010).*

Bai, Y. et al. "Binder jetting additive manufacturing with a particle-free metal ink as a binder precursor." 2018. Materials and design. 147. p. 146-156. (Year: 2018).*

Article Synthetic Latexes, Chemical Encyclopedia, V. 2, revised by Knunyants I.L., Moscow, 1990, pp. 1150-1151.

Encyclopedia of Polymers, Editor-in-Chief V.A. Kabanov, Soviet Encyclopedia, V. 2, 1974, pp. 40-42, 664-678.

* cited by examiner

THREE-DIMENSIONAL PRINTING

BACKGROUND

Three-dimensional (3D) printing may be an additive printing process used to make three-dimensional solid parts from a digital model. 3D printing can be often used in rapid product prototyping, mold generation, mold master generation, and short run manufacturing. Some 3D printing techniques are considered additive processes because they involve the application of successive layers of material. This is unlike customary machining processes, which often rely upon the removal of material to create the final part. 3D printing can often use curing or fusing of the building material, which for some materials may be accomplished using heat-assisted extrusion, melting, or sintering.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
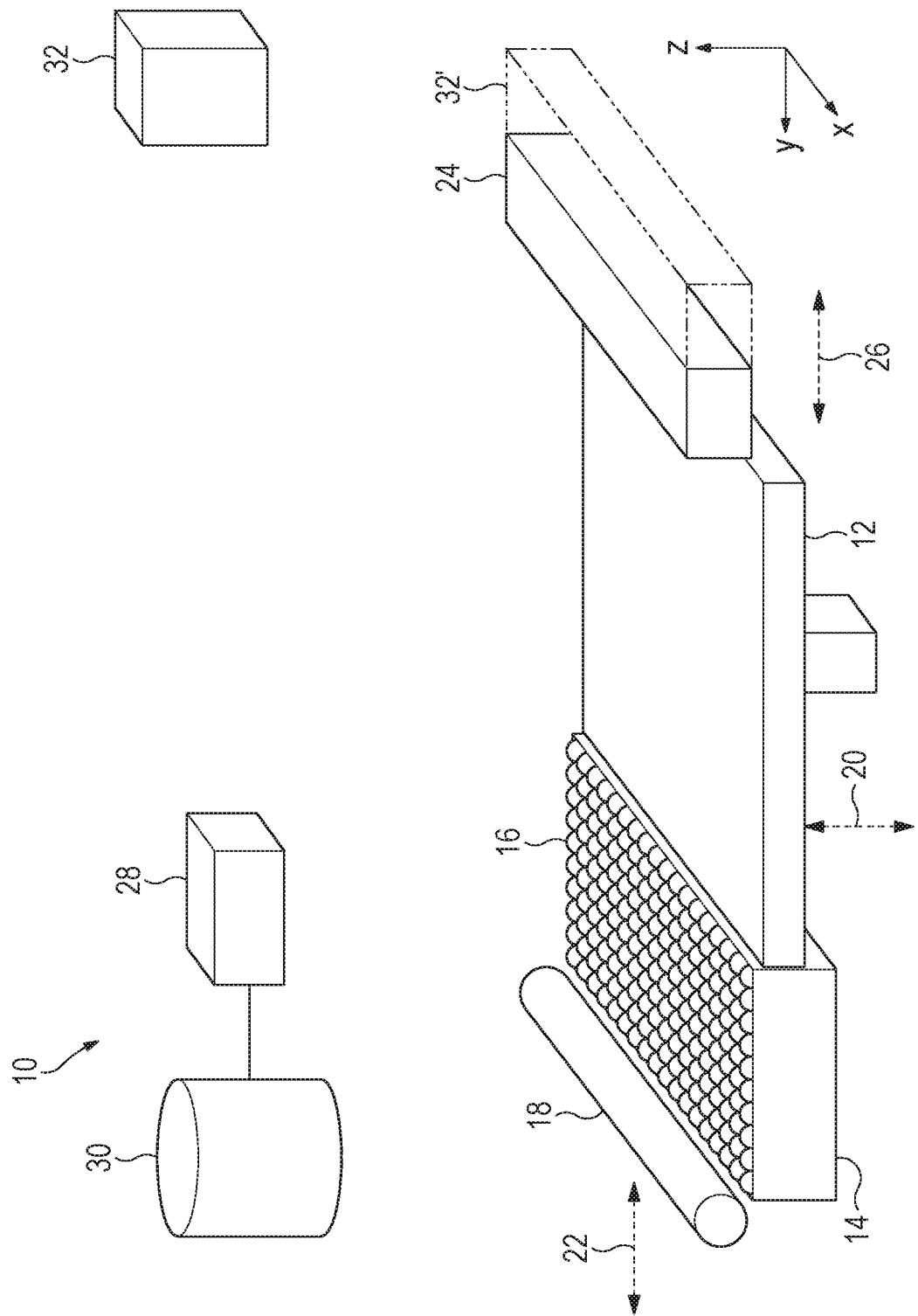
FIG. 1 is a simplified isometric view of an example 3D printing system disclosed herein.

In some examples of three-dimensional (3D) printing, a binder fluid (also known as a liquid functional agent/material) is selectively applied to a layer of build material in a powder bed. The application of a layer of build material and then applying a binder fluid layer with repetition of these steps can lead to form a green part (also referred to as a green body) in the powder bed. The binder fluid may include a binder that holds the build material of the green part together. The green part may then be exposed to electromagnetic radiation and/or heat to sinter the build material in the green part to form the 3D part.

Examples of the 3D printing kits, methods, and systems disclosed herein utilize a single binder fluid or a multi-fluid binder. The single binder fluid or one of the fluids in the multi-fluid binder include polymer particles, in order to produce a patterned green part from metal powder build material, and also utilize heat to activate the polymer particles and create a cured green part. The cured green part can be removed from the metal powder build material that was not patterned with the binder fluid, without deleteriously affecting the structure of the cured green part. The extracted, cured green part can then undergo de-binding to produce an at least substantially polymer-free gray part, and the at least substantially polymer-free gray part may then undergo sintering to form the final 3D printed part/object.

The single binder fluid can further include metal or metal precursor particles which can include metal nanoparticles, metal oxide nanoparticles, metal oxide nanoparticles and a reducing agent, or combinations thereof, in order to produce a patterned green part from metal powder build material, and also utilize heat to form metallic connections and create a cured green part. The cured green part can be removed from the metal powder build material that was not patterned with the binder fluid, without deleteriously affecting the structure of the cured green part. The extracted, cured green part can then undergo de-binding to produce an at least substantially polymer-free gray part, and the at least substantially polymer-free gray part may then undergo sintering to form the final 3D printed part/object.

The multi-fluid binder can include a separate binder fluid from the polymer particle containing fluid. This separate binder fluid can include metal or metal precursor particles which can include metal nanoparticles, metal oxide nanoparticles, metal oxide nanoparticles and a reducing agent, or combinations thereof, or combinations thereof, in order to produce a patterned green part from metal powder build material, and also utilize heat to form metallic connections and create a cured green part. The cured green part can be removed from the metal powder build material that was not patterned with the binder fluid, without deleteriously affecting the structure of the cured green part. The extracted, cured green part can then undergo de-binding to produce an at least substantially polymer-free gray part, and the at least substantially polymer-free gray part may then undergo sintering to form the final 3D printed part/object.

As used herein, the term "bound metal object" or "patterned green part" refers to an intermediate part that has a shape representative of the final 3D printed part and that includes metal powder build material patterned with the binder fluid. In the patterned green part, the metal powder build material particles may or may not be weakly bound together by one or more components of the binder fluid and/or by attractive force(s) between the metal powder build material particles and the binder fluid. In some instances, the mechanical strength of the patterned green part is such that it cannot be handled or extracted from a build material platform. Moreover, it is to be understood that any metal powder build material that is not patterned with the binder fluid is not considered to be part of the patterned green part, even if it is adjacent to or surrounds the patterned green part.

As used herein, the term "cured green part" refers to a patterned green part that has been exposed to a heating process that initiates melting of the polymer particles and/or initiates melting of the metal or metal precursor particles. The heating process may also contribute to the evaporation of the liquid components of the binder fluid(s). Compared to the patterned green part, the mechanical strength of the cured green part is greater, and in some instances, the cured green part can be handled or extracted from the build material platform.

It is to be understood that the term "green" when referring to the patterned green part or the cured green part does not connote color, but rather indicates that the part is not yet fully processed and/or completed.

As used herein, the term "at least substantially polymer-free gray part" refers to a cured green part that has been exposed to a heating process that initiates thermal decomposition of the polymer particles so that the polymer particles are at least partially removed. In some instances, volatile organic components of or produced by the thermally decomposed polymer particles are completely removed and a very small amount of nonvolatile residue from the thermally decomposed polymer particles may remain (e.g., <1 wt % of the initial binder). In other instances, the thermally decomposed polymer particles (including any products and residues) are completely removed. In other words, the "at least substantially polymer-free gray part" refers to an intermediate part with a shape representative of the final 3D printed part and that includes metal powder build material bound together as a result of i) weak sintering (i.e., low level necking between the particles, which is able to preserve the part shape), or ii) a small amount of the cured polymer particles remaining, or iii) capillary forces and/or Van der Waals resulting from polymer particle removal, and/or iv) any combination of i, ii, and/or iii.

It is to be understood that the term "gray" when referring to the at least substantially polymer-free gray part does not connote color, but rather indicates that the part is not yet fully processed.

The at least substantially polymer-free gray part may have porosity similar to or greater than the cured green part (due to polymer particle removal), but the porosity is at least substantially eliminated during the transition to the 3D printed part.

As used herein, the terms "three-dimensional object," "3D object," "3D printed part," "3D part," or "metal part" refer to a completed, sintered part.

In the examples disclosed herein, the single binder fluid or multi-fluid binders when applied to a layer of metal powder build material, the liquid vehicle in the fluid(s) is capable of wetting the build material and the polymer particles and/or the metal or metal precursor particles are capable of penetrating into the microscopic pores of the layer (i.e., the spaces between the metal powder build material particles).

3D Printing Kits
Multi-Fluid Kits

In the examples disclosed herein, a multi-fluid kit for three-dimensional printing is described. The multi-fluid kit can comprise a first fluid comprising a first liquid vehicle comprising metal or metal precursor particles; and a second fluid comprising a second liquid vehicle comprising latex polymer particles dispersed therein, wherein the latex polymer particles have an average particle size of from about 10 nm to about 300 nm, and wherein the metal or metal precursor particles comprise metal nanoparticles, metal oxide nanoparticles, metal oxide nanoparticles and a reducing agent, or combinations thereof.

The latex polymer particles can be made from (A) a co-polymerizable surfactant chosen from polyoxyethylene alkylphenyl ether ammonium sulfate, sodium polyoxyethylene alkylether sulfuric ester, polyoxyethylene styrenated phenyl ether ammonium sulfate, or mixtures thereof, and (B) styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, acetoacetoxyethyl methacrylate, or combinations thereof.

The latex polymer particles can comprise 2-phenoxyethyl methacrylate, cyclohexyl methacrylate, cyclohexyl acrylate, methacrylic acid, or combinations thereof.

The latex polymer particles can comprise styrene, methyl methacrylate, butyl acrylate, methacrylic acid, or combinations thereof.

The latex polymer particles can be present in the second fluid in an amount ranging from about 5 wt % to about 40 wt % based on the total weight of the second fluid.

The first liquid vehicle and the second liquid vehicle can comprise water each in an amount of from about 45 wt % to about 75 wt % based on the total weight of the first liquid vehicle and the second liquid vehicle, respectively.

The metal nanoparticles can comprise, nickel, silver, gold, copper, platinum, or combinations thereof.

The metal oxide nanoparticles can comprise oxides of iron, nickel, silver, gold, copper, platinum, cobalt, manganese, vanadium, molybdenum, or combinations thereof.

The reducing agent can be selected from the group consisting of aldehydes, hydrazides, hydrazine, ascorbic acid, reducing saccharides, or combinations thereof.

Single Fluid Kits

In the examples disclosed herein, is a kit for three-dimensional printing. The kit can comprise powdered metal build material; and a binding fluid comprising a liquid vehicle, metal or metal precursor particles, and latex polymer particles dispersed in the liquid vehicle, wherein the latex polymer particles have an average particle size of from about 10 nm to about 300 nm, and wherein the metal or metal precursor particles comprise metal nanoparticles, metal oxide nanoparticles, metal oxide nanoparticles and a reducing agent, or combinations thereof.

The latex polymer particles can be made from (A) a co-polymerizable surfactant chosen from polyoxyethylene alkylphenyl ether ammonium sulfate, sodium polyoxyethylene alkylether sulfuric ester, polyoxyethylene styrenated phenyl ether ammonium sulfate, or mixtures thereof, and (B) styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, acetoacetoxyethyl methacrylate, or combinations thereof.

The latex polymer particles can comprise 2-phenoxyethyl methacrylate, cyclohexyl methacrylate, cyclohexyl acrylate, methacrylic acid, or combinations thereof.

The latex polymer particles can comprise styrene, methyl methacrylate, butyl acrylate, methacrylic acid, or combinations thereof.

The powered metal build material can comprise steels, bronzes, titanium and alloys thereof, aluminum and alloys thereof, nickel and alloys thereof, cobalt and alloys thereof, iron and alloys thereof, nickel cobalt alloys, gold and alloys thereof, silver and alloys thereof, platinum and alloys thereof, copper and alloys thereof, or combinations thereof.

The metal nanoparticles can comprise nickel, silver, gold, copper, platinum, or combinations thereof.

The metal oxide nanoparticles can comprise oxides of iron, nickel, silver, gold, copper, platinum, cobalt, manganese, vanadium, molybdenum, or combinations thereof.

The reducing agent is selected from the group consisting of aldehydes, hydrazides, hydrazine, ascorbic acid, reducing saccharides, or combinations thereof.

The latex polymer particles can be present in the binding fluid in an amount ranging from about 5 wt % to about 40 wt % based on the total weight of the binding fluid.

3D Printing Methods
Multi-Fluid Methods

In the examples disclosed herein, a method of printing a three-dimensional object is described. The method can comprise (i) depositing a metal powder build material in a powder bed; (ii) based on a three-dimensional object model, selectively applying a first fluid and a second fluid on the metal powder build material in the powder bed, wherein the first fluid comprises a first liquid vehicle comprising metal or metal precursor particles, wherein the metal or metal precursor particles comprise metal nanoparticles, metal oxide nanoparticles, metal oxide nanoparticles and a reducing agent, or combinations thereof, and the second fluid comprises a second liquid vehicle comprising latex polymer particles dispersed therein, wherein the latex polymer particles have an average particle size of from about 10 nm to about 300 nm (iii) repeating (i), and (ii) at least once to form the three-dimensional object; and (iv) heating the powder bed to a temperature of up to about 200° C.

The method can further comprise (v) removing the three-dimensional object from the powder bed and heating the three-dimensional object to a temperature of up to about 500° C.

The heating to the temperature of up to about 500° C. can comprise removing at least about 95 wt % of the latex polymer particles by thermally decomposing the latex polymer particles and initiate binding of metal powder particles with the metal or metal precursor particles.

The latex polymer particles can be present in the second fluid in an amount ranging from about 1 wt % to about 50 wt % based on the total weight of the second fluid.

The method can further comprise (vi) heating the three-dimensional object in a sintering oven to a sintering temperature of greater than about 500° C.

Single Fluid Methods

In the examples disclosed herein, a method of printing a three-dimensional object is disclosed. The method can comprise (i) depositing a metal powder build material in a powder bed; (ii) based on a three-dimensional object model, selectively applying a binding fluid on the metal powder build material in the powder bed, wherein the binding fluid comprises a liquid vehicle, metal or metal precursor particles, and latex polymer particles dispersed in the liquid vehicle, wherein the metal or metal precursor particles comprise metal nanoparticles, metal oxide nanoparticles, metal oxide nanoparticles and a reducing agent, or combinations thereof, and wherein the latex polymer particles have an average particle size of from about 10 nm to about 300 nm; (iii) repeating (i) and (ii) at least one time to form the three-dimensional object; and (iv) heating the powder bed to a temperature of up to about 200° C.

The method can further comprise (v) heating the three-dimensional object in the powder bed to a temperature of up to about 500° C.

The method can further comprise (vi) heating the three-dimensional object to a sintering temperature of greater than about 500° C.

A method of using the single fluid kit can comprise applying the powdered build material and then the binding fluid in a three-dimensional printing bed.

3D Printing Systems

In the examples disclosed herein, a printing system for printing a three-dimensional object is disclosed. The printing system can comprise a supply of one or more binding fluids; a supply of metal powdered build material; a build material distributor; a fluid applicator for selectively dispensing the binding fluid; a heat source; a controller; and a non-transitory computer readable medium having stored thereon computer executable instructions to cause the controller to print the three-dimensional object by: utilizing the build material distributor and the fluid applicator to iteratively form at least one layer of powdered metal build material having selective application of the binding fluid, and utilizing the heat source to heat the selectively applied binding fluid on the powdered metal build material to form the three-dimensional object.

The powered metal build material can comprise steels, bronzes, titanium and alloys thereof, aluminum and alloys thereof, nickel and alloys thereof, cobalt and alloys thereof, iron and alloys thereof, nickel cobalt alloys, gold and alloys thereof, silver and alloys thereof, platinum and alloys thereof, copper and alloys thereof, or combinations thereof.

In some examples, a first fluid can comprise a first liquid vehicle comprising metal or metal precursor particles. In some examples, a second fluid can comprise a second liquid vehicle comprising latex polymer particles dispersed therein, wherein the latex polymer particles have an average particle size of from about 10 nm to about 300 nm.

In the multi-fluid examples, the metal or metal precursor particles can comprise metal nanoparticles, metal oxide nanoparticles, metal oxide nanoparticles and a reducing agent, or combinations thereof.

In the single fluid examples, the metal or metal precursor particles can comprise metal nanoparticles, metal oxide nanoparticles, metal oxide nanoparticles and a reducing agent, or combinations thereof.

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The three-dimensional (3D) printing system 10 generally includes a supply 14 of metal powder build material 16; a build material distributor 18; a supply of a binder fluid 36; an inkjet applicator 24 for selectively dispensing the binder fluid 36 (FIG. 2C): at least one heat source 32; a controller 28; and a non-transitory computer readable medium having stored thereon computer executable instructions to cause the controller 28 to: utilize the build material distributor 18 and the inkjet applicator 24 to iteratively form multiple layers 34 (FIG. 2B) of metal powder build material 16 which are applied by the build material distributor 18 and have received the binder fluid 36, thereby creating a patterned green part 42 (FIG. 2E), and utilize the at least one heat source 32 to heat the patterned green part 42 creating a cured green part 42'. In some examples, the cured green part 42' is heated creating an at least substantially polymer-free gray part 48. The at least substantially polymer-free gray part 48 or the cured green part 42' are heated to a sintering temperature to form a metal part 50.

As shown in FIG. 1, the printing system 10 includes a build area platform 12, the build material supply 14 containing metal powder build material particles 16, and the build material distributor 18.

The build area platform (sometimes referred to as the powder bed in this application) 12 receives the metal powder build material 16 from the build material supply 14. The build area platform 12 may be integrated with the printing system 10 or may be a component that is separately insertable into the printing system 10. For example, the build area platform 12 may be a module that is available separately from the printing system 10. The build area platform 12 that is shown is also one example, and could be replaced with another support member, such as a platen, a fabrication/print bed, a glass plate, or another build surface.

Figure 2A:
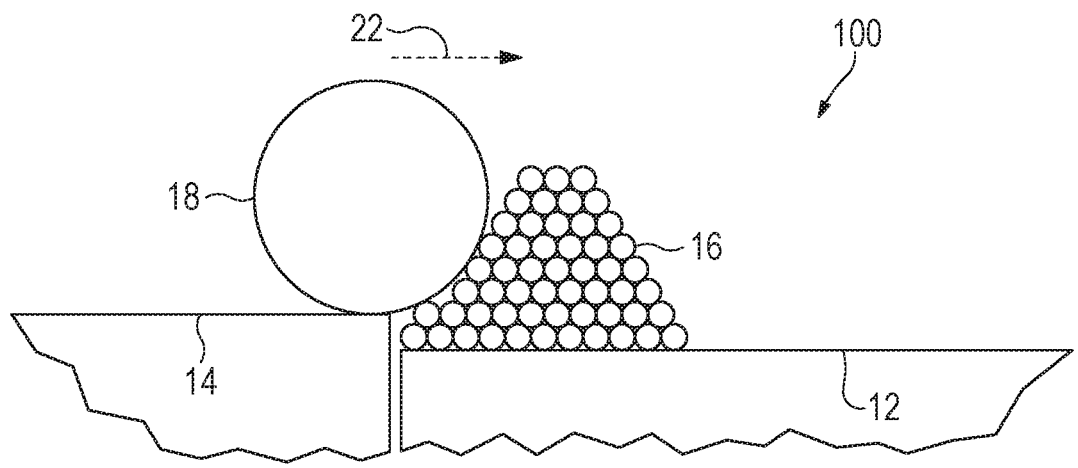
FIGS. 2A through 2F are schematic views depicting the formation of a patterned green part, a cured green part, an at least substantially polymer-free gray part, and a 3D metal part using examples of a 3D printing method disclosed herein.
Figure 2B:
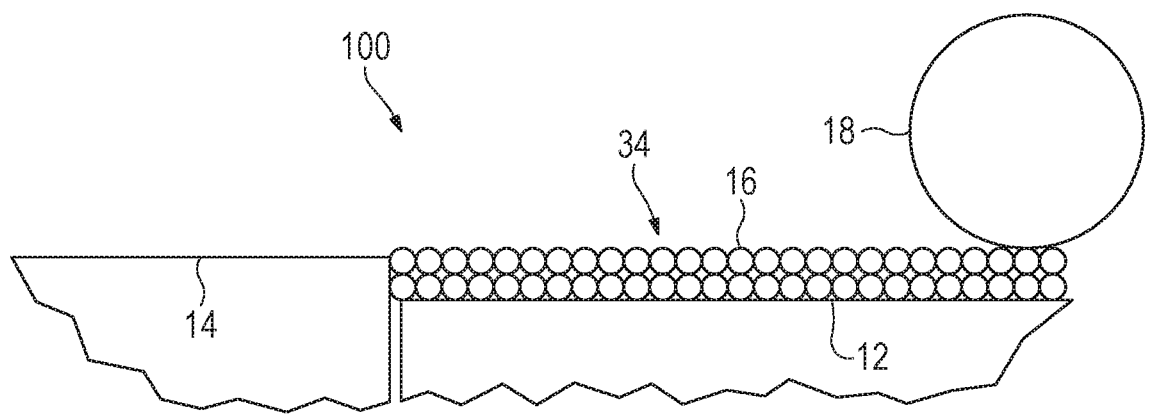
Figure 2C:
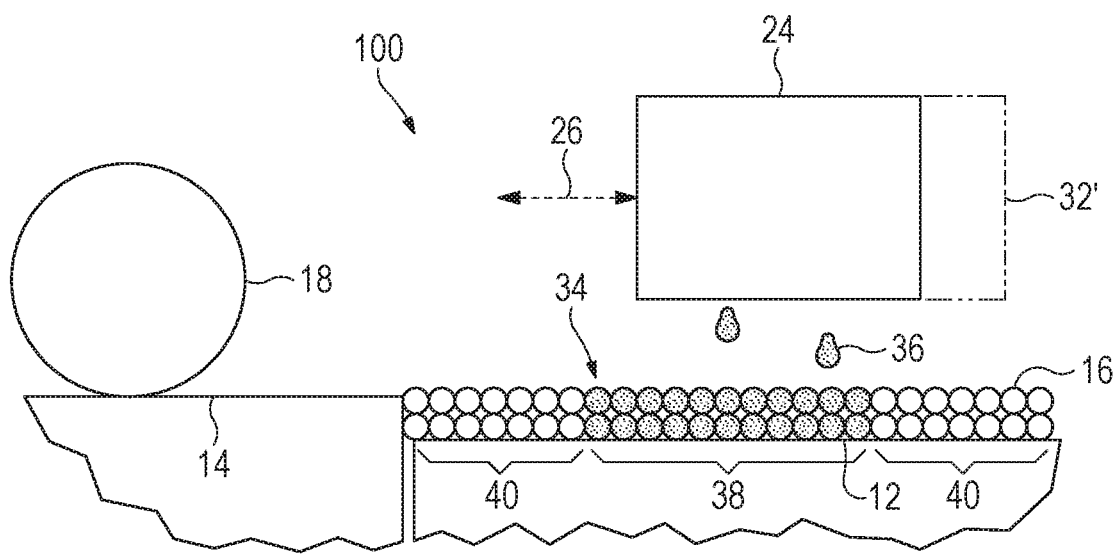
Figure 2D:
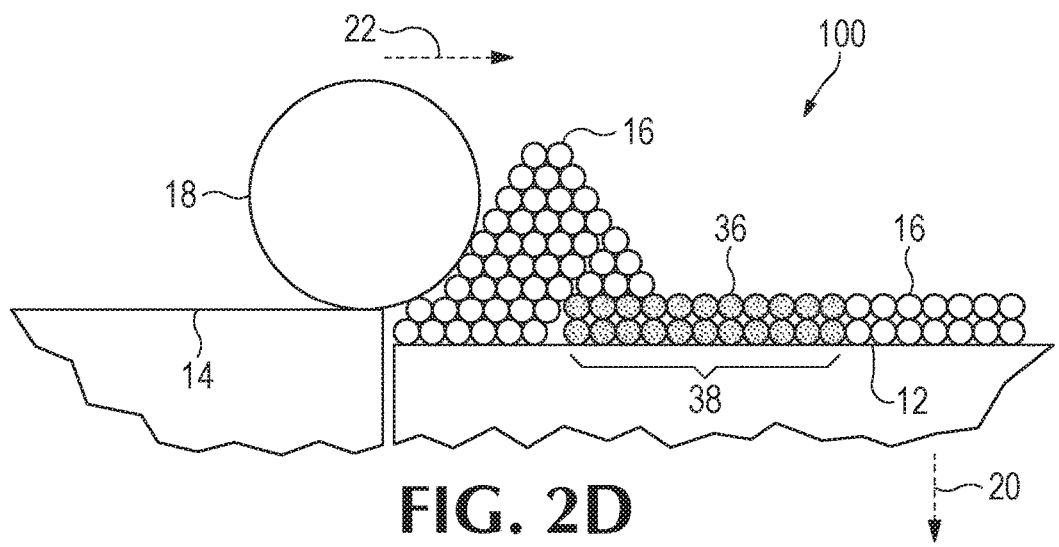

The build area platform 12 may be moved in a direction as denoted by the arrow 20, e.g., along the z-axis, so that metal powder build material 16 may be delivered to the platform 12 or to a previously formed layer of metal powder build material 16 (see FIG. 2D). In an example, when the metal powder build material particles 16 are to be delivered, the build area platform 12 may be programmed to advance (e.g., downward) enough so that the build material distributor 18 can push the metal powder build material particles 16 onto the platform 12 to form a layer 34 of the metal powder build material 16 thereon (see, e.g., FIGS. 2A and 2B). The build area platform 12 may also be returned to its original position, for example, when a new part is to be built.

The build material supply 14 may be a container, bed, or other surface that is to position the metal powder build material particles 16 between the build material distributor 18 and the build area platform 12. In some examples, the build material supply 14 may include a surface upon which the metal powder build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the metal powder build material particles 16 from a storage location to a position to be spread onto the build area platform 12 or onto a previously formed layer of metal powder build material 16.

The build material distributor 18 may be moved in a direction as denoted by the arrow 22, e.g., along the y-axis, over the build material supply 14 and across the build area platform 12 to spread a layer of the metal powder build material 16 over the build area platform 12. The build material distributor 18 may also be returned to a position adjacent to the build material supply 14 following the spreading of the metal powder build material 16. The build material distributor 18 may be a blade (e.g., a doctor blade), a roller, a combination of a roller and a blade, and/or any other device capable of spreading the metal powder build material particles 16 over the build area platform 12. For instance, the build material distributor 18 may be a counter-rotating roller.

The metal powder build material 16 may be any particulate metallic material. In an example, the metal powder build material 16 may be a powder. In another example, the metal powder build material 16 may have the ability to sinter into a continuous body to form the metal part 50 (see, e.g., FIG. 2F) when heated to the sintering temperature (e.g., a temperature ranging from about 850° C. to about 1400° C.). By "continuous body," it is meant that the metal powder build material particles are merged together to form a single part with little or no porosity and with sufficient mechanical strength to meet the requirements of the desired, final metal part 50.

While an example sintering temperature range is provided, it is to be understood that this temperature may vary, depending, in part, upon the composition and phase(s) of the metal powder build material 16.

The applicator 24 may be scanned across the build area platform 12 in the direction indicated by the arrow 26, e.g., along the y-axis. The applicator 24 may be, for instance, an inkjet applicator, such as a thermal inkjet printhead, a piezoelectric printhead, or combinations thereof, and may extend a width of the build area platform 12. While the applicator 24 is shown in FIG. 1 as a single applicator, it is to be understood that the applicator 24 may include multiple applicators that span the width of the build area platform 12. In some examples, a single or multiple applicators 24 can be used to apply the single fluid binder or multi-fluid binder.

Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the binder fluid 36 over a large area of a layer of the metal powder build material 16. The applicator 24 may thus be attached to a moving XY stage or a translational carriage (neither of which is shown) that moves the applicator 24 adjacent to the build area platform 12 in order to deposit the binder fluid 36 in predetermined areas of a layer of the metal powder build material 16 that has been formed on the build area platform 12 in accordance with the method(s) disclosed herein. The applicator 24 may include a plurality of nozzles (not shown) through which the binder fluid 36 is to be ejected.

The "binder fluid 36" as used herein refers to the single fluid binder or multi-fluid binders.

As discussed above, the multi-fluid binder kit for three-dimensional printing comprises a first fluid comprising a first liquid vehicle comprising metal or metal precursor particles; and a second fluid comprising a second liquid vehicle comprising latex polymer particles dispersed therein, wherein the latex polymer particles have an average particle size of from about 10 nm to about 300 nm, and wherein the metal or metal precursor particles comprise metal nanoparticles, metal oxide nanoparticles, metal oxide nanoparticles and a reducing agent, or combinations thereof.

As discussed above, the single-fluid binder for three-dimensional printing comprises a binding fluid comprising a liquid vehicle, metal or metal precursor particles, and latex polymer particles dispersed in the liquid vehicle, wherein the latex polymer particles have an average particle size of from about 10 nm to about 300 nm, and wherein the metal or metal precursor particles comprise metal nanoparticles, metal oxide nanoparticles, metal oxide nanoparticles and a reducing agent, or combinations thereof.

The applicator 24 may deliver drops of the binder fluid 36 at a resolution ranging from about 300 dots per inch (DPI) to about 1200 DPI. In other examples, the applicator 24 may deliver drops of the binder fluid 36 at a higher or lower resolution. The drop velocity may range from about 2 m/s to about 24 m/s and the firing frequency may range from about 1 kHz to about 100 kHz. In one example, each drop may be in the order of about 10 picoliters (pl) per drop, although it is contemplated that a higher or lower drop size may be used. For example, the drop size may range from about 1 pl to about 400 pl. In some examples, applicator 24 is able to deliver variable size drops of the binder fluid 36.

Each of the previously described physical elements may be operatively connected to a controller 28 of the printing system 10. The controller 28 may control the operations of the build area platform 12, the build material supply 14, the build material distributor 18, and the applicator 24. As an example, the controller 28 may control actuators (not shown) to control various operations of the 3D printing system components. The controller 28 may be a computing device, a semiconductor-based microprocessor, a central processing unit (CPU), an application specific integrated circuit (ASIC), and/or another hardware device. Although not shown, the controller 28 may be connected to the 3D printing system 10 components via communication lines.

The controller 28 manipulates and transforms data, which may be represented as physical (electronic) quantities within the printer's registers and memories, in order to control the physical elements to create the 3D part 50. As such, the controller 28 is depicted as being in communication with a data store 30. The data store 30 may include data pertaining to a 3D part 50 to be printed by the 3D printing system 10. The data for the selective delivery of the metal powder build material particles 16, the binder fluid 36, or combinations thereof may be derived from a model of the 3D part 50 to be formed. For instance, the data may include the locations on each layer of metal powder build material particles 16 that the applicator 24 is to deposit the binder fluid 36. In one example, the controller 28 may use the data to control the applicator 24 to selectively apply the binder fluid 36. The data store 30 may also include machine readable instructions (stored on a non-transitory computer readable medium) that are to cause the controller 28 to control the amount of metal powder build material particles 16 that is supplied by the build material supply 14, the movement of the build area platform 12, the movement of the build material distributor 18, the movement of the applicator 24, or combinations thereof.

As shown in FIG. 1, the printing system 10 may also include a heater 32. In some examples, the heater 32 includes a conventional furnace or oven, a microwave, or devices capable of hybrid heating (i.e., conventional heating and microwave heating). This type of heater 32 may be used for heating the entire build material cake 44 (see FIG. 2E) after the printing is finished or for heating the cured green part 42' or for heating the at least substantially polymer-free gray part 48 after the cured green part 42' is removed from the build material cake 44 (see FIG. 2F). In some examples, patterning may take place in the printing system 10, and then the build material platform 12 with the patterned green part 42 thereon may be detached from the system 10 and placed into the heater 32 for the various heating stages.

In other examples, the heater 32 may be a conductive heater or a radiative heater (e.g., infrared lamps) that is integrated into the system 10. These other types of heaters 32 may be placed below the build area platform 12 (e.g., conductive heating from below the platform 12) or may be placed above the build area platform 12 (e.g., radiative heating of the build material layer surface). Combinations of these types of heating may also be used. These other types of heaters 32 may be used throughout the 3D printing process. In still other examples, the heater 32 may be a radiative heat source (e.g., a curing lamp) that is positioned to heat each layer 34 (see FIG. 2C) after the binder fluid 36 has been applied thereto. In the example shown in FIG. 1, the heater 32 is attached to the side of the applicator 24, which allows for printing and heating in a single pass.

Figure 2E:
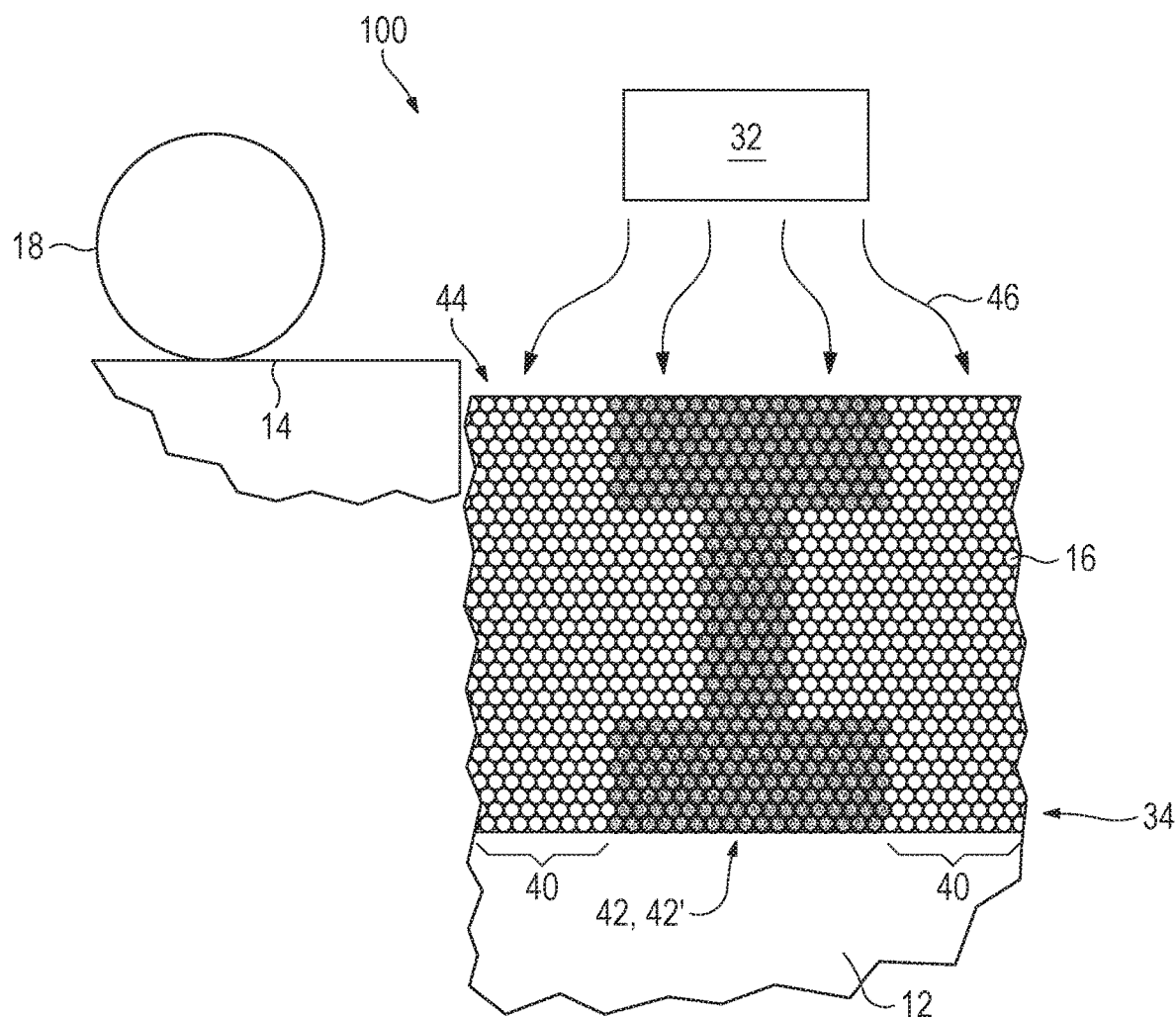
Figure 2F:
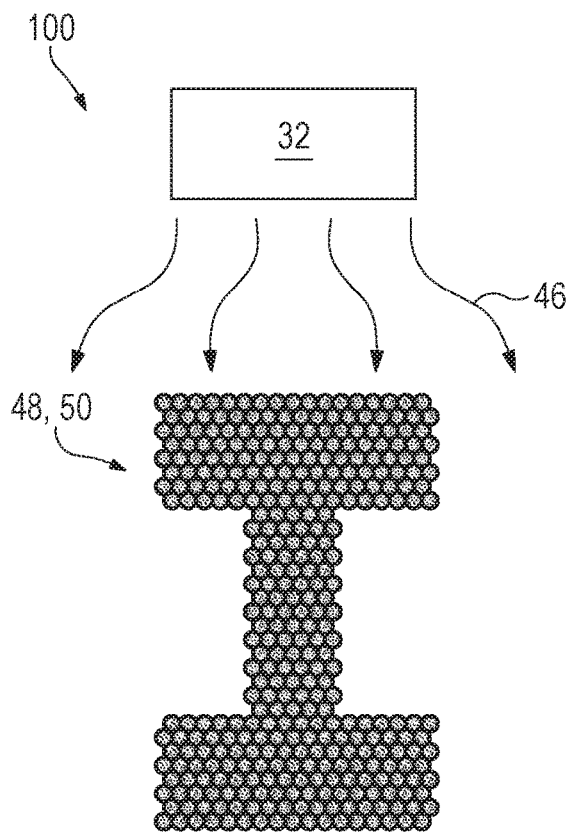
Figure 3:
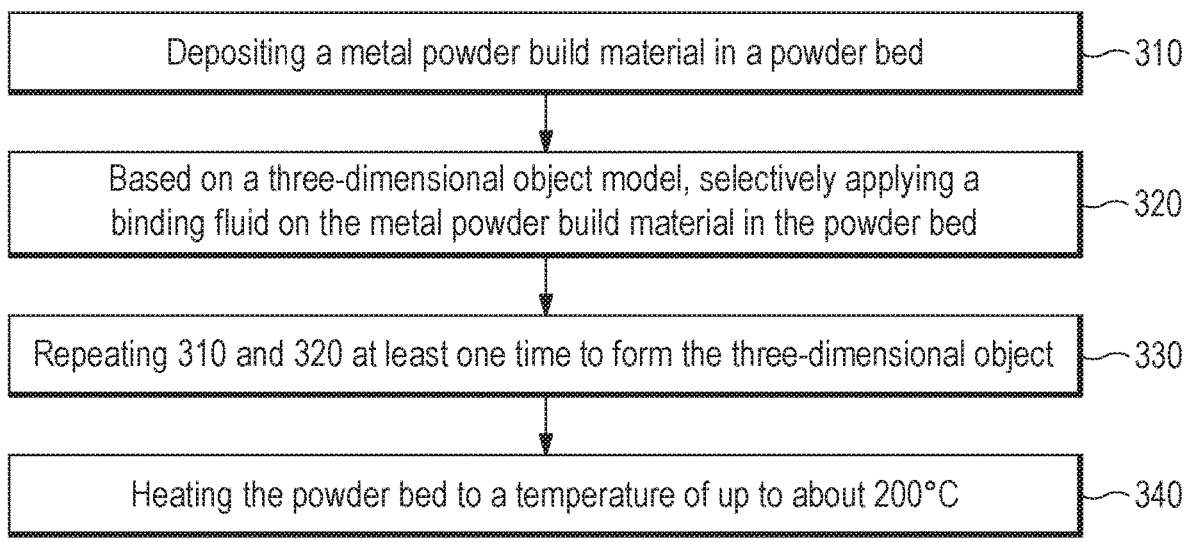
FIG. 3 is a flow diagram illustrating another example of a 3D printing method disclosed herein.

It is to be understood that an example of the method 300 shown in FIG. 3 is discussed in detail herein, e.g., in FIGS. 2A-2F and the text corresponding thereto.

Referring now to FIGS. 2A through 2F, an example of the 3D printing method is depicted. Prior to execution of the method or as part of the method (which could be method 300), the controller 28 may access data stored in the data store 30 pertaining to a 3D part 50 that is to be printed. The controller 28 may determine the number of layers of metal powder build material particles 16 that are to be formed, and the locations at which binder fluid 36 from the applicator 24 is to be deposited on each of the respective layers.

As shown in FIGS. 2A and 2B, the 3D printing method can include applying the metal powder build material 16. In FIG. 2A, the build material supply 14 may supply the metal powder build material particles 16 into a position so that they are ready to be spread onto the build area platform 12. In FIG. 2B, the build material distributor 18 may spread the supplied metal powder build material particles 16 onto the build area platform 12. The controller 28 may execute control build material supply instructions to control the build material supply 14 to appropriately position the metal powder build material particles 16, and may execute control spreader instructions to control the build material distributor 18 to spread the supplied metal powder build material particles 16 over the build area platform 12 to form a layer 34 of metal powder build material particles 16 thereon. As shown in FIG. 2B, one layer 34 of the metal powder build material particles 16 has been applied.

The layer 34 has a substantially uniform thickness across the build area platform 12. In an example, the thickness of the layer 34 ranges from about 30 μm to about 300 μm, although thinner or thicker layers may also be used. For example, the thickness of the layer 34 may range from about 20 μm to about 500 μm. The layer thickness may be about 2× the particle diameter (as shown in FIG. 2B) at a minimum for finer part definition. In some examples, the layer thickness may be about 1.2× (i.e., 1.2 times) the particle diameter.

Referring now to FIG. 2C, the method continues by selectively applying the binding fluid (also referred to as binder fluid) 36 on a portion 38 of the metal powder build material 16. The binder fluid 36 may be dispensed from one or more applicators 24. The applicator 24 may be a thermal inkjet printhead or a piezoelectric printhead, and the selectively applying of the binder fluid 36 may be accomplished by the associated printing technique. As such, the selectively applying of the binder fluid 36 may be accomplished by thermal inkjet printing or piezo electric inkjet printing.

The controller 28 may execute instructions to control the applicator 24 (e.g., in the directions indicated by the arrow 26) to deposit the binder fluid 36 onto predetermined portion(s) 38 of the metal powder build material 16 that are to become part of a patterned green part 42 and are to ultimately be sintered to form the 3D part 50. The applicator 24 may be programmed to receive commands from the controller 28 and to deposit the binder fluid 36 according to a pattern of a cross-section for the layer of the 3D part 50 that is to be formed. As used herein, the cross-section of the layer of the 3D part 50 to be formed refers to the cross-section that is parallel to the surface of the build area platform 12. In the example shown in FIG. 2C, the applicator 24 selectively applies the binder fluid 36 on those portion(s) 38 of the layer 34 that are to be fused to become the first layer of the 3D part 50. As an example, if the 3D part that is to be formed is to be shaped like a cube or cylinder, the binder fluid 36 will be deposited in a square pattern or a circular pattern (from a top view), respectively, on at least a portion of the layer 34 of the metal powder build material particles 16. In the example shown in FIG. 2C, the binder fluid 36 is deposited in a square pattern on the portion 38 of the layer 34 and not on the portions 40.

The applicator 24 (while one is shown there can be multiple applicators) can apply the binder fluid 36 or the first fluid and the second fluid (not shown) simultaneously, consecutively, or sequentially. When the first fluid and the second fluid are applied simultaneously, the components in the fluids can mix in-situ on the metal powder build material 16. When the first fluid and the second fluid are applied consecutively or sequentially, there can be limited to no in-situ mixing of the two fluids on the metal powder build material 16. The consecutive application of the first and second fluids can be carried out in any order depending on the desired final properties of the final part.

When the binder fluid 36 is selectively applied in the desired portion(s) 38, the polymer particles and metal or metal precursor particles (present in the binder fluid 36) infiltrate the inter-particles spaces among the metal powder build material particles 16. The volume of the binder fluid 36 that is applied per unit of metal powder build material 16 in the patterned portion 38 may be sufficient to fill a major fraction, or most of the porosity existing within the thickness of the portion 38 of the layer 34.

It is to be understood that portions 40 of the metal powder build material 16 that do not have the binder fluid 36 applied thereto also do not have the polymer particles and metal or metal precursor particles introduced thereto. As such, these portions do not become part of the patterned green part 42 that is ultimately formed.

The processes shown in FIGS. 2A through 2C may be repeated to iteratively build up several patterned layers and to form the patterned green part 42 (see FIG. 2E).

FIG. 2D illustrates the initial formation of a second layer of metal powder build material 16 on the layer 34 patterned with the binder fluid 36. In FIG. 2D, following deposition of the binder fluid 36 onto predetermined portion(s) 38 of the layer 34 of metal powder build material 16, the controller 28 may execute instructions to cause the build area platform 12 to be moved a relatively small distance in the direction denoted by the arrow 20. In other words, the build area platform 12 may be lowered to enable the next layer of metal powder build material 16 to be formed. For example, the build material platform 12 may be lowered a distance that is equivalent to the height of the layer 34. In addition, following the lowering of the build area platform 12, the controller 28 may control the build material supply 14 to supply additional metal powder build material 16 (e.g., through operation of an elevator, an auger, or the like) and the build material distributor 18 to form another layer of metal powder build material particles 16 on top of the previously formed layer 34 with the additional metal powder build material 16. The newly formed layer may be patterned with binder fluid 36.

Referring back to FIG. 2C, in another example of the method, the layer 34 may be exposed to heating using heater 32 after the binder fluid 36 is applied to the layer 34 and before another layer is formed. The heater 32 may be used for heating layer-by-layer and/or for heating the intermediate part. Heating to form the cured green part may take place at an activating temperature that is capable of activating (or curing) the polymer particles in the binder fluid 36, but that is not capable of melting or sintering the metal powder build material 16. Heating to form the cured green part may further take place at a curing temperature that is capable of forming metal connections between the metal or metal precursor particles in the binder fluid 36.

In some examples, the heater 32 can be a photonic fusing source, such as, a Xenon (Xe) strobe lamp.

In some examples, the at least one energy source may be a continuous wave discharge lamp including xenon, argon, neon, krypton, sodium vapor, metal halide, or mercury-vapor. In another example, the heater 32 may be an array of pulse lasers, continuous wave lasers, light-emitting diode (LED) lasers, or a combination thereof. In this example, the array may produce a uniformly dispersed beam. In still another example, the heater 32 may be a flash discharge lamp including xenon or krypton. In still another example, the heater 32 may be a tungsten-halogen continuous wave lamp. In yet another example, the heater 32 may be a synchrotron light source that emits light having a wavelength above 200 nm.

The heater 32 can be capable of emitting enough energy to fuse the metal powder build material 16 by flash fusing the polymer particles and the metal or metal precursor particles. When the heater 32 is a single pulse light source, the heater 32 may be capable of delivering from about 0.5 J to about 100 J/cm$^2$. The amount of energy the heater 32 is capable of delivering may be less than 70 J/cm$^2$ when the heater 32 is multiple pulse light sources and may be greater than 50 J/cm$^2$ when the heater 32 is a continuous wave light source.

The activating temperature and the fusing temperature are not capable of melting or sintering the metal powder build material 16.

In an example, the activation temperature is about the glass transition temperature of the polymer particles. Other examples of suitable activation temperatures are provided below. In an example, the fusing temperature can be about 80° C. to about 250° C., or from about 90° C. to about 240° C., or from about 100° C. to about 230° C.

In some examples, the processes shown in FIGS. 2A through 2C (including the heating of the layer 34) may be repeated to iteratively build up several cured layers (one layer at a time) to produce the cured green part 42. The cured green part 42' can then be exposed to the processes described in reference to FIG. 2F. In some examples, instead of layer-by-layer heating to activating and fusing temperatures, the build material cake or intermediate part 44 is heated to the activating and fusing temperatures.

Repeatedly forming and patterning new layers (without curing each layer) results in the formation of a build material cake or intermediate part 44, as shown in FIG. 2E, which includes the patterned green part 42 residing within the non-patterned portions 40 of each of the layers 34 of metal powder build material 16. The patterned green part 42 is a volume of the build material cake 44 that is filled with the metal powder build material 16 and the binder fluid 36 within the inter-particle spaces. The remainder of the build material cake 44 is made up of the non-patterned metal powder build material 16.

As shown in FIG. 2E, the build material cake 44 may be exposed to heat or radiation to generate heat, as denoted by the arrows 46. The heat applied may be sufficient to activate and fuse the particles in the binder fluid 36, in the patterned green part 42 and to produce a stabilized and cured green part 42'. In one example, the heat source 32 may be used to apply the heat to the build material cake 44. In the example shown in FIG. 2E, the build material cake 44 may remain on the build area platform 12 while being heated by the heat source 32. In another example, the build area platform 12, with the build material cake 44 thereon, may be detached from the applicator 24 and placed in the heat source 32.

The activation/curing temperature may depend, in part, on one or more of: the $T_g$ of the polymer particles, the melt viscosity of the polymer particles, and/or whether and which coalescing solvent is used. In an example, heating to form the cured green part 42' may take place at a temperature that is capable of activating (or curing) the binder fluid 36, but that is not capable of sintering the metal powder build material 16 or of thermally degrading the polymer particles of the binder fluid 36. In an example, the activation temperature is about the minimum film forming temperature (MFFT) or the glass transition temperature of the bulk material of the polymer particles of the binder fluid 36 and below the thermal decomposition temperature of the polymer particles (i.e., below a temperature threshold at which thermal decomposition occurs). For a majority of suitable latex-based polymer particles, the upper limit of the activation/curing temperature ranges from about 250° C. to about 270° C. Above this temperature threshold, the polymer particles would chemically degrade into volatile species and leave the patterned green part 42, and thus would stop performing their function. In other examples, the binder fluid 36 activation temperature may be greater than the MFFT or the glass transition temperature of the polymer particles. As an example, the binder fluid activation temperature may range from about 20° C. to about 200° C. As another example, the binder fluid activation temperature may range from about 100° C. to about 200° C. As still another example, the binder fluid activation temperature may range from about 80° C. to about 200° C. As still another example, the binder fluid activation temperature may be about 90° C.

The length of time at which the heat 46 is applied and the rate at which the patterned green part 42 is heated may be dependent, for example, on one or more of: characteristics of the heat or radiation source 32, characteristics of the polymer particles, characteristics of the metal or metal precursor particles, characteristics of the metal powder build material 16 (e.g., metal type, particle size, or combinations thereof), and/or the characteristics of the 3D part 50 (e.g., wall thickness).

The patterned green part 42 may be heated at the binder fluid activation temperature for an activation and fusing time period ranging from about 1 minute to about 360 minutes. In an example, the activation/curing time period is 30 minutes. In another example, the activation and fusing time period may range from about 2 minutes to about 240 minutes. The patterned green part 42 may be heated to the binder fluid activation and fusing temperature at a rate of about 1° C./minute to about 10° C./minute, although it is contemplated that a slower or faster heating rate may be used. The heating rate may depend, in part, on one or more of: the binder fluid 36 used, the size (i.e., thickness and/or area (across the x-y plane)) of the layer 34 of metal powder build material 16, and/or the characteristics of the 3D part 50 (e.g., size, wall thickness, or combinations thereof). In an example, patterned green part 42 is heated to the binder fluid activation and fusing temperature at a rate of about 2.25° C./minute.

Heating to about the MFFT or the glass transition temperature of the polymer particles causes the polymer particles to coalesce into a continuous polymer phase among the metal powder build material particles 16 of the patterned green part 42. As mentioned above, the coalescing solvent (when included in the binder fluid 36) plasticizes the polymer particles and enhances the coalescing of the polymer particles. The continuous polymer phase may act as a heat-activated adhesive between the metal powder build material particles 16 to form the stabilized, cured green part 42'.

Heating to form the cured green part may further take place at a fusing temperature that is capable of forming metal connections between the metal or metal precursor particles in the binder fluid 36. In an example, the fusing temperature can be about 100° C. to about 300° C., or from about 90° C. to about 240° C., or from about 200° C. to about 300° C. The metal connections act as an adhesive between the metal powder build material particles 16 to form the stabilized, cured green part 42'.

In some examples, one of the continuous polymer phase or the metal connections acts as an adhesive between the metal powder build material particles 16 to form the stabilized, cured green part 42'. In some examples, both the continuous polymer phase or the metal connections acts as an adhesive between the metal powder build material particles 16 to form the stabilized, cured green part 42'.

Heating to form the cured green part 42' may also result in the evaporation of a significant fraction of the fluid from the patterned green part 42. The evaporated fluid may include any of the binder fluid or first and second fluid components. Fluid evaporation may result in some densification, through capillary action, of the cured green part 42'.

The stabilized, cured green part 42' exhibits handleable mechanical durability.

The cured green part 42' may then be extracted from the build material cake 44. The cured green part 42' may be extracted by any suitable means. In an example, the cured green part 42' may be extracted by lifting the cured green part 42' from the unpatterned metal powder build material particles 16. An extraction tool including a piston and a spring may be used.

When the cured green part 42' is extracted from the build material cake 44, the cured green part 42' may be removed from the build area platform 12 and placed in a heating mechanism. The heating mechanism may be the heater 32.

In some examples, the cured green part 42' may be cleaned to remove unpatterned metal powder build material particles 16 from its surface. In an example, the cured green part 42' may be cleaned with a brush and/or an air jet.

After the extraction and/or the cleaning of the cured green part 42', the cured green part 42' may be heated to remove the activated polymer particles (which have coalesced into the continuous polymer phase) to produce an at least substantially polymer-free gray part 48, as shown in FIG. 2F. In other words, the cured green part 42' may be heated to remove the continuous polymer phase. However, the metal or metal precursor particles remain in the polymer-free gray part 48. Then, the at least substantially polymer-free gray part 48 may be sintered to form the final 3D part 50, also as shown in FIG. 2F. Heating to de-bind and heating to sinter take place at two different temperatures, where the temperature for de-binding is lower than the temperature for sintering. Both the de-binding and the sintering heating stages are generally depicted in FIG. 2F, where heat or radiation to generate heat may be applied as denoted by the arrows 46 from the heat source 32.

In an example, the thermal decomposition temperature ranges from about 250° C. to about 600° C. In another example, the thermal decomposition temperature ranges from about 280° C. to about 600° C., or to about 500° C. The continuous polymer phase may have a clean thermal decomposition mechanism (e.g., leaves <5 wt % solid residue of the initial binder, and in some instances <1 wt % solid residue of the initial binder). The smaller residue percentage (e.g., close to 0%) is more desirable. During the de-binding stage, the long chains of the continuous polymer phase decompose first intro shorter molecular fragments, which turn into a liquid phase of lower viscosity. Capillary pressure developing during evaporation of this liquid pulls the metal powder build material particles 16 together leading to further densification and formation of the at least substantially polymer-free gray part 48.

While not being bound to any theory, it is believed that the at least substantially polymer-free gray part 48 may maintain its shape due, for example, to one or more of: i) the low amount of stress experienced by the at least substantially polymer-free gray part 48 due to it not being physically handled, ii) low level necking occurring between the metal powder build material particles 16 and the polymer particles and metal or metal precursor particles, and/or iii) capillary forces pushing the metal powder build material particles 16 together generated by the removal of the continuous polymer phase. The at least substantially polymer-free gray part 48 may maintain its shape although the continuous polymer phase is at least substantially removed and the metal powder build material particles 16 is not yet sintered at least because of the metal connections between the metal or metal precursor particles in the interstitial spaces between the powder build material particles 16.

Heating to sinter is accomplished at a sintering temperature that is sufficient to sinter the remaining metal powder build material particles 16. The sintering temperature is dependent upon the composition of the metal powder build material particles 16. During heating/sintering, the at least substantially polymer-free gray part 48 may be heated to a temperature ranging from about 80% to about 99.9% of the melting point or the solidus, eutectic, or peritectic temperature of the metal powder build material 16. In another example, the at least substantially polymer-free gray part 48 may be heated to a temperature ranging from about 90% to about 95% of the melting point or the solidus, eutectic, or peritectic temperature of the metal powder build material 16. In still another example, the at least substantially polymer-free gray part 48 may be heated to a temperature ranging from about 60% to about 85% of the melting point or the solidus, eutectic, or peritectic temperature of the metal powder build material 16. The sintering heating temperature may also depend upon the particle size and time for sintering (i.e., high temperature exposure time).

As an example, the sintering temperature may range from about 850° C. to about 1400° C. In another example, the sintering temperature is at least 900° C. An example of a sintering temperature for bronze is about 850° C., and an example of a sintering temperature for stainless steel is between about 1200° C. and 1500° C. While these temperatures are provided as sintering temperature examples, it is to be understood that the sintering heating temperature depends upon the metal powder build material 16 that is utilized. Heating at a suitable temperature sinters and fuses the metal powder build material particles 16 to form a completed 3D part 50, which may be even further densified relative to the at least substantially polymer-free gray part 48. For example, as a result of sintering, the density may go from 50% density to over 90%, and in some cases very close to 100% of the theoretical density.

During sintering, the metal or metal precursor particles (metal nanoparticles) may adjust shape and diffuse between the metal powder build material particles 16 allowing formation of strong mechanical connections. The sintering process can improve adhesion between the metal nanoparticles and the metal powder build material particles 16. Sintering can also be used to increase the density of the part. For example, small voids in the polymer-free gray part 48 may be filled with diffusing metal nanoparticles during sintering. Diffusion sintering regimes and remodeling sintering regimes are within the knowledge of the skilled practitioner and useful texts are available to provide guidance and models for such operations, for example: Randall German, 1994, Metal Powder Industries Federation, Princeton, N.J.

The length of time at which the heat 46 (for each of de-binding and sintering) is applied and the rate at which the part 42, 48 is heated may be dependent, for example, on one or more of: characteristics of the heat or radiation source 32, characteristics of the polymer particles, characteristics of the metal nanoparticles, characteristics of the metal powder build material 16 (e.g., metal type, particle size, or combinations thereof), and/or the characteristics of the 3D part 50 (e.g., wall thickness).

The cured green part 42 may be heated at the thermal decomposition temperature for a thermal decomposition time period ranging from about 10 minutes to about 72 hours. In an example, the thermal decomposition time period is 60 minutes. In another example, thermal decomposition time period is 180 minutes. The cured green part 42' may be heated to the thermal decomposition temperature at a rate ranging from about 0.5° C./minute to about 20° C./minute. The heating rate may depend, in part, on one or more of: the amount of the continuous polymer phase in the cured green part 42', the porosity of the cured green part 42', and/or the characteristics of the cured green part 42'/3D part 50 (e.g., size, wall thickness, or combinations thereof).

The at least substantially polymer-free gray part 48 may be heated at the sintering temperature for a sintering time period ranging from about 20 minutes to about 15 hours. In an example, the sintering time period is 240 minutes. In another example, the sintering time period is 360 minutes. The at least substantially polymer-free gray part 48 may be heated to the sintering temperature at a rate ranging from about 1° C./minute to about 20° C./minute. In an example, the at least substantially polymer-free gray part 48 is heated to the sintering temperature at a rate ranging from about 10° C./minute to about 20° C./minute. A high ramp rate up to the sintering temperature may be desirable to produce a more favorable grain structure or microstructure. However, in some instances, slower ramp rates may be desirable. As such, in another example, the at least substantially polymer-free gray part 48 is heated to the sintering temperature at a rate ranging from about 1° C./minute to about 3° C./minute. In yet another example, the at least substantially polymer-free gray part 48 is heated to the sintering temperature at a rate of about 1.2° C./minute. In still another example, the at least substantially polymer-free gray part 48 is heated to the sintering temperature at a rate of about 2.5° C./minute.

In example of the method: the heating of the cured green part 42' to the thermal decomposition temperature is performed for a thermal decomposition time period ranging from about 30 minutes to about 72 hours; and the heating of the at least substantially polymer-free gray part 48 to the sintering temperature is performed for a sintering time period ranging from about 20 minutes to about 15 hours. In another example of the method: the heating of the cured green part 42' to the thermal decomposition temperature is accomplished at a rate ranging from about 0.5° C./minute to about 10° C./minute; and the heating of the at least substantially polymer-free gray part 48 to the sintering temperature is accomplished at a rate ranging from about 1° C./minute to about 20° C./minute.

In some examples of the method, the heat 46 (for each of de-binding and sintering) is applied in an environment containing an inert gas, a low reactivity gas, a reducing gas, or a combination thereof. In other words, the heating of the cured green part 42' to the thermal decomposition temperature and the heating of the at least substantially polymer-free gray part 48 to the sintering temperature are accomplished in an environment containing an inert gas, a low reactivity gas, a reducing gas, or a combination thereof. The de-binding may be accomplished in an environment containing an inert gas, a low reactivity gas, and/or a reducing gas so that the continuous polymer phase thermally decomposes rather than undergo an alternate reaction which would fail to produce the at least substantially polymer-free gray part 48 and/or to prevent the oxidation of the metal powder build material 16. The sintering may be accomplished in an environment containing an inert gas, a low reactivity gas, and/or a reducing gas so that the metal powder build material 16 will sinter rather than undergoing an alternate reaction (e.g., an oxidation reaction) which would fail to produce the metal 3D part 50. Examples of inert gas include argon, helium, or other similar noble inert gases. An example of a low reactivity gas includes nitrogen and examples of reducing gases include hydrogen, carbon monoxide, or a mixture thereof.

In other examples of the method, the heat 46 (for each of de-binding (i.e., heating of the cured green body 42' to the thermal decomposition temperature) and sintering (i.e., heating of the at least substantially polymer free grey part to the sintering temperature)) is applied in an environment containing carbon in addition to an inert gas, a low reactivity gas, a reducing gas, or a combination thereof. The de-binding and the sintering may be accomplished in an environment containing carbon to reduce the partial pressure of oxygen in the environment and further prevent the oxidation of the metal powder build material 16 during de-binding and sintering. An example of the carbon that may be placed in the heating environment includes graphite rods. In other examples, a graphite furnace may be used.

In still other examples of the method, the heat 46 (for each of de-binding and sintering) is applied in a low gas pressure or vacuum environment. The de-binding and the sintering may be accomplished in a low gas pressure or vacuum environment so that the continuous polymer phase thermally decomposes and/or to prevent the oxidation of the metal powder build material 16. Moreover, sintering at the low gas pressure or under vacuum may allow for more complete or faster pore collapse, and thus higher density parts. However, vacuum may not be used during sintering when the metal powder build material 16 (e.g., Cr) is capable of evaporating in such conditions. In an example, the low pressure environment is at a pressure ranging from about 1E-5 torr ($1*10^{-5}$ torr) to about 10 torr.

Although not shown, the operations depicted in FIGS. 2E and 2F may be automated and the controller 28 may control the operations.

In FIG. 3, a flow diagram shows a method of printing a three-dimensional object (300) comprising: (i) depositing a metal powder build material in a powder bed 310; (ii) based on a three-dimensional object model, selectively applying a binding fluid on the metal powder build material in the powder bed (320), wherein the binding fluid comprises a liquid vehicle, metal or metal precursor particles, and latex polymer particles dispersed in the liquid vehicle, wherein the metal or metal precursor particles comprise metal nanoparticles, metal oxide nanoparticles, metal oxide nanoparticles and a reducing agent, or combinations thereof, and wherein the latex polymer particles have an average particle size of from about 10 nm to about 300 nm; (iii) repeating (i) and (ii) at least one time to form the three-dimensional object (330); and (iv) heating the powder bed to a temperature of up to about 200° C. (340).

Metal Powder Build Material

In an example, the metal powder build material 16 is a single phase metal material composed of one element. In this example, the sintering temperature may be below the melting point of the single element.

In another example, the metal powder build material 16 is composed of two or more elements, which may be in the form of a single phase metal alloy or a multiple phase metal alloy. In these other examples, melting generally occurs over a range of temperatures. For some single phase metal alloys, melting begins just above the solidus temperature (where melting is initiated) and is not complete until the liquidus temperature (temperature at which all the solid has melted) is exceeded. For other single phase metal alloys, melting begins just above the peritectic temperature. The peritectic temperature is defined by the point where a single phase solid transforms into a two phase solid plus liquid mixture, where the solid above the peritectic temperature is of a different phase than the solid below the peritectic temperature. When the metal powder build material 16 is composed of two or more phases (e.g., a multiphase alloy made of two or more elements), melting generally begins when the eutectic or peritectic temperature is exceeded. The eutectic temperature is defined by the temperature at which a single phase liquid completely solidifies into a two phase solid. Generally, melting of the single phase metal alloy or the multiple phase metal alloy begins just above the solidus, eutectic, or peritectic temperature and is not complete until the liquidus temperature is exceeded. In some examples, sintering can occur below the solidus temperature, the peritectic temperature, or the eutectic temperature. In other examples, sintering occurs above the solidus temperature, the peritectic temperature, or the eutectic temperature. Sintering above the solidus temperature is known as super solidus sintering, and this technique may be desirable when using larger build material particles and/or to achieve high density. In an example, the build material composition may be selected so that at least 40 vol % of the metal powder build material is made up of phase(s) that have a melting point above the desired sintering temperature. It is to be understood that the sintering temperature may be high enough to provide sufficient energy to allow atom mobility between adjacent particles.

Single elements or alloys may be used as the metal powder build material 16. Some examples of the metal powder build material 16 include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, Ti6Al4V, and Ti-6Al-4V EL7. While several example alloys have been provided, it is to be understood that other alloy build materials may be used, such as PbSn soldering alloys.

Any metal powder build material 16 may be used that is in powder form at the outset of the 3D printing method(s) disclosed herein. As such, the melting point, solidus temperature, eutectic temperature, and/or peritectic temperature of the metal powder build material 16 may be above the temperature of the environment in which the patterning portion of the 3D printing method is performed (e.g., above 40° C.). In some examples, the metal powder build material 16 may have a melting point ranging from about 850° C. to about 3500° C. In other examples, the metal powder build material 16 may be an alloy having a range of melting points. Alloys may include metals with melting points as low as −39° C. (e.g., mercury), or 30° C. (e.g., gallium), or 157° C. (indium), or combinations thereof.

The metal powder build material 16 may be made up of similarly sized particles or differently sized particles. In the examples shown herein (FIG. 1 and FIGS. 2A-2F), the metal powder build material 16 includes similarly sized particles. The term "size", as used herein with regard to the metal powder build material 16, refers to the diameter of a substantially spherical particle (i.e., a spherical or near-spherical particle having a sphericity of >0.84), or the average diameter of a non-spherical particle (i e, the average of multiple diameters across the particle). Substantially spherical particles of this particle size have good flowability and can be spread relatively easily. As an example, the average particle size of the particles of the metal powder build material 16 may range from about 1 µm to about 200 µm. As another example, the average size of the particles of the metal powder build material 16 ranges from about 10 µm to about 150 µm. As still another example, the average size of the particles of the metal powder build material 16 ranges from 15 µm to about 100 µm.

Binder Fluid or First Fluid and Second Fluid

As shown in FIG. 1, the printing system 10 also includes an applicator 24, which may contain the binder fluid 36 (shown in FIG. 2C) disclosed herein. In some examples, the binder fluid 36 (also referred to herein as the binding fluid 36) can be created, stored, and applied as two separate fluids—a first fluid and a second fluid. As discussed above, the first fluid can comprise a first liquid vehicle comprising metal or metal precursor particles and the second fluid can comprise a second liquid vehicle comprising latex polymer particles dispersed therein. The latex polymer particles have an average particle size of from about 10 nm to about 300 nm and the metal or metal precursor particles comprise metal nanoparticles, metal oxide nanoparticles, metal oxide nanoparticles and a reducing agent, or combinations thereof.

While not shown in FIG. 2C, the binder fluid 36 can be one single fluid or two separate fluids—the first fluid and the second fluid, which is/are ejected from one or more applicators 24 (only one applicator shown) onto the metal powder build material 16.

The binder fluid 36 includes at least the liquid vehicle, the polymer particles, and the metal or metal precursor particles. In some instances, the binder fluid 36 consists of the liquid vehicle, the polymer particles, and the metal or metal precursor particles, without any other components.

In some examples, the binding fluid (also referred to as the binder fluid herein) has a pH of from about 6.5 to about 9, or less than about 8.5, or less than about 8, or less than about 7.5, or at least about 6.8, or at least about 6.9, or at least about 7, or at least about 7.5.

In some examples, the viscosity of the binding fluid composition is less than about 10 cps, or less than about 15 cps, or less than about 14 cps, or less than about 13 cps, or less than about 12 cps, or less than about 11 cps, or less than about 10 cps, or less than about 9 cps, or less than about 8 cps, or less than about 7 cps, or less than about 6 cps, or less than about 5 cps, or less than about 4 cps, or less than about 3 cps.

In some examples, the first fluid can comprise a first liquid vehicle comprising metal or metal precursor particles with no other components and the second fluid can comprise a second liquid vehicle comprising latex polymer particles dispersed therein with no other components.

All liquid vehicles described herein—in the binding fluid 36, in the first fluid and in the second fluid—can all be the same or similar. The pH of the first fluid and the second fluid can be from about 6.5 to about 9, or less than about 8.5, or less than about 8, or less than about 7.5, or at least about 6.8, or at least about 6.9, or at least about 7, or at least about 7.5. The viscosity of the first fluid and the second fluid can be less than about 10 cps, or less than about 15 cps, or less than about 14 cps, or less than about 13 cps, or less than about 12 cps, or less than about 11 cps, or less than about 10 cps, or less than about 9 cps, or less than about 8 cps, or less than about 7 cps, or less than about 6 cps, or less than about 5 cps, or less than about 4 cps, or less than about 3 cps.

Polymer Particles

In the examples disclosed herein, the polymer particles may be dispersed in the liquid vehicle. The polymer particles may have any morphology—e.g., single-phase, or core-shell, partially occluded, multiple-lobed, or combinations thereof.

In one example, the polymer particles may be made of two different copolymer compositions. These might be fully separated "core-shell" polymers, partially occluded mixtures, or intimately comingled as a "polymer solution." In another example, the polymer particle morphology may resemble a raspberry, in which a hydrophobic core is surrounded by a large number of smaller hydrophilic particles that are attached to the core. In still another example, the polymer particles may include 2, 3, 4, or more relatively large particle "lobes" surrounding a smaller polymer core.

The polymer particles may be any latex polymer (i.e., polymer that is capable of being dispersed in an aqueous medium) that is jettable via inkjet printing (e.g., thermal inkjet printing or piezoelectric inkjet printing). In some examples disclosed herein, the polymer particles are heteropolymers or co-polymers. The heteropolymers may include a more hydrophobic component and a more hydrophilic component. In these examples, the hydrophilic component renders the particles dispersible in the binder fluid 36, while the hydrophobic component is capable of coalescing upon exposure to heat in order to temporarily bind the metal powder build material particles 16 together to form the cured green part 42'.

Examples of low $T_g$ monomers that may be used to form the hydrophobic component include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

Examples of monomers that can be used in forming the polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid. 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In an example, the selected monomer(s) is/are polymerized to form a polymer, heteropolymer, or copolymer. In some examples, the monomer(s) are polymerized with a co-polymerizable surfactant. In some examples, the co-polymerizable surfactant can be a polyoxyethylene compound. In some examples, the co-polymerizable surfactant can be a Hitenol® compound e.g., polyoxyethylene alkylphenyl ether ammonium sulfate, sodium polyoxyethylene alkylether sulfuric ester, polyoxyethylene styrenated phenyl ether ammonium sulfate, or mixtures thereof. Any suitable polymerization process may be used. The polymer particles may have a particle size that can be jetted via thermal inkjet printing or piezoelectric printing or continuous inkjet printing. In an example, the particle size of the polymer particles ranges from about 10 nm to about 300 nm.

In some examples, the polymer particles have a MFFT or a glass transition temperature ($T_g$) that is greater (e.g., >) than ambient temperature. In other examples, the polymer particles have a MFFT or glass transition temperature ($T_g$) that is much greater (e.g., >>) than ambient temperature (i.e., at least 15° higher than ambient). As used therein, "ambient temperature" may refer to room temperature (e.g., ranging about 18° C. to about 22° C.), or to the temperature of the environment in which the 3D printing method is performed. Examples of the 3D printing environment ambient temperature may range from about 40° C. to about 50° C. The MFFT or the glass transition temperature $T_g$ of the bulk material (e.g., the more hydrophobic portion) of the polymer particles may range from 25° C. to about 125° C. In an example, the MFFT or the glass transition temperature $T_g$ of the bulk material (e.g., the more hydrophobic portion) of the polymer particles is about 40° C. or higher. The MFFT or the glass transition temperature $T_g$ of the bulk material may be any temperature that enables the polymer particles to be inkjet printed without becoming too soft at the printer operating temperatures.

The polymer particles may have a MFFT or glass transition temperature ranging from about 125° C. to about 200° C. In an example, the polymer particles may have a MFFT or glass transition temperature of about 160° C.

The weight average molecular weight of the polymer particles may range from about 10,000 Mw to about 500,000 Mw. In some examples, the weight average molecular weight of the polymer particles ranges from about 100,000 Mw to about 500,000 Mw. In some other examples, the weight average molecular weight of the polymer particles ranges from about 150,000 Mw to 300,000 Mw.

When each of the polymer particles contains a low $T_g$ hydrophobic component and a high $T_g$ hydrophilic component, the polymer particles may be prepared by any suitable method. As examples, the polymer particles may be prepared by one of the following methods.

In an example, the polymer particles may be prepared by polymerizing high $T_g$ hydrophilic monomers to form the high $T_g$ hydrophilic component and attaching the high $T_g$ hydrophilic component onto the surface of the low $T_g$ hydrophobic component.

In another example, each of the polymer particles may be prepared by polymerizing the low $T_g$ hydrophobic monomers and the high $T_g$ hydrophilic monomers at a ratio of the low $T_g$ hydrophobic monomers to the high $T_g$ hydrophilic monomers that ranges from 5:95 to 30:70. In this example, the soft low $T_g$ hydrophobic monomers may dissolve in the hard high $T_g$ hydrophilic monomers.

In still another example, each of the polymer particles may be prepared by starting the polymerization process with the low $T_g$ hydrophobic monomers, then adding the high $T_g$ hydrophilic monomers, and then finishing the polymerization process. In this example, the polymerization process may cause a higher concentration of the high $T_g$ hydrophilic monomers to polymerize at or near the surface of the low $T_g$ hydrophobic component.

In still another example, each of the polymer particles may be prepared by starting a copolymerization process with the low $T_g$ hydrophobic monomers and the high $T_g$ hydrophilic monomers, then adding additional high $T_g$ hydrophilic monomers, and then finishing the copolymerization process. In this example, the copolymerization process may cause a higher concentration of the high $T_g$ hydrophilic monomers to copolymerize at or near the surface of the low $T_g$ hydrophobic component.

The low $T_g$ hydrophobic monomers and/or the high $T_g$ hydrophilic monomers used in any of these examples may be any of the low $T_g$ hydrophobic monomers and/or the high $T_g$ hydrophilic monomers (respectively) listed above. In an example, the low $T_g$ hydrophobic monomers are selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high $T_g$ hydrophilic monomers are selected from the group consisting of acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof.

The resulting polymer particles may exhibit a core-shell structure, a mixed or intermingled polymeric structure, or some other morphology.

The polymer particles may be present in the binder fluid 36 in an amount ranging from about 2 wt % to about 50 wt %, or from about 3 wt % to about 40 wt %, or from about 5 wt % to about 30 wt %, or from about 10 wt % to about 20 wt %, or from about 12 wt % to about 18 wt %, or about 15 wt % (based upon the total wt % of the binder fluid 36). In another example, the polymer particles may be present in the binder fluid 36 in an amount ranging from about 20 vol % to about 40 vol % (based upon the total vol % of the binder fluid 36). It is believed that these polymer particle loadings provide a balance between the binder fluid 36 having jetting reliability and binding efficiency. In an example, the polymer particles are present in the binder fluid in an amount ranging from about 2 wt % to about 30 wt %, and the coalescing solvent is present in the binder fluid in an amount ranging from about 0.1 wt % to about 50 wt %.

In an example, the latex polymer particles have an average particle size of from about 10 nm to about 300 nm, or from about 50 nm to about 300 nm, or from about 100 nm to about 300 nm, or from about 110 nm to about 300 nm, from about 120 nm to about 300 nm, or from about 130 nm to about 300 nm, or from about 140 nm to about 300 nm, or from about 150 nm to about 300 nm, or from about 160 nm to about 290 nm, or from about 170 nm to about 300 nm, or from about 180 nm to about 2700 nm, or from about 190 nm to about 250 nm, or from about 190 nm to about 230 nm, or from about 190 nm to about 220 nm, or from about 190 nm to about 210 nm, or about 200 nm.

Metal or Metal Precursor Particles

In some examples, the metal or metal precursor particles can comprise metal nanoparticles, metal oxide nanoparticles, metal oxide nanoparticles and a reducing agent, or combinations thereof.

The metal nanoparticles can comprise, nickel, silver, gold, copper, platinum, or combinations thereof. The metal oxide nanoparticles can comprise oxides of iron, nickel, silver, gold, copper, platinum, cobalt, manganese, vanadium, molybdenum, or combinations thereof. The reducing agent can be selected from the group consisting of aldehydes, hydrazides, hydrazine, ascorbic acid, reducing saccharides, or combinations thereof.

The metal or metal precursor particles can encompass a wide range of shapes, sizes, distributions, and materials. Whatever shape, size, distribution, or material is used, the particles retain their shape during the process of applying them to the metal powder material 16 and forming metal connections between the metal powder material particles 16. The metal or metal precursor particles may be of any shape. The metal or metal precursor particles may be formed by processing. The metal or metal precursor particles may be naturally shaped materials. The metal or metal precursor particles may include a variety of different shapes. The metal or metal precursor particles may be selected and/or sorted to have a given geometry. The metal or metal precursor particles may include flakes, sheets, plates, or similar flattened, primarily two-dimensional geometry. The metal or metal precursor particles may include rods, spindles, spheres, or blocks. The metal or metal precursor particles may have a mean and/or median particle diameter of less an about 1000 nm, or less than about 500 nm, or less than about 200 nm, or less than about 100 nm, or from about 10 nm to about 100 nm, or from about 1 μm to about 1000 μm, or from about 10 μm to about 500 μm, or from about 50 μm to about 200 μm.

The metal or metal precursor particles used may be of a single size distribution. The metal or metal precursor particles may include a mixture of multiple size distributions. The metal or metal precursor particles may all have a similar and/or identical composition. Alternately, several different types of metal or metal precursor particles may be combined. For example, multiple types of metal or metal precursor particles can be combined to form an alloy after a secondary heating operation. Alternately, composition gradients can be formed. For example, areas of a part needing ductility may have a higher nickel concentration. By comparison, nickel concentration may be at a reduced level near surfaces that will be in contact with skin. The formation of structured/supported electrodes can be formed. For example, a small area of a noble metal such as platinum or gold can be formed in an area of a refractory metal such as titanium. The refractory metal can be oxidized in a post-forming process to form an insulator leaving the noble metal area to act as an electrode. Because both the metal or metal precursor particles and the deposited metal can be selected and applied with high precision, a wide variety of non-uniform materials can be readily formed. Thus, composition gradients in the consolidated part can be formed using variation of the particles, variation of the deposited metal connections, or both.

In some examples, the metal or metal precursor particles may be formed of a wide variety of materials including, but not limited to: metal, metal oxides, metal carbides, metal nitrides, ceramics, non-metals, metalloids, semiconductors, polymers (especially thermosets but including thermoplastic polymers), minerals, carbon black, graphite, diamond, organic materials, or combinations thereof. The metal or metal precursor particles are stable during the formation of the metal connections. As this may be accomplished in a variety of ways described below, different materials will be more and/or less suited for particular approaches. Further, the material selection has a significant impact on the characteristics of the consolidated part and what kinds of secondary processes may be used. Clearly, the particles selected will also impact the characteristics of a final part.

The metal or metal precursor particles can be formed from a wide variety of metals. However, the surface of some metals tends to oxidize, forming metal oxides. In some examples, it is advantageous to coat the metal or metal precursor particles to prevent or reduce the surface oxidation. The coating may be of a second metal. For example, an iron nanoparticle could be coated with silver to avoid oxidation. The coating may be a polymer. For example, a nickel nanoparticle could be coated with polyethylene. The coating may be a suitable organic or inorganic coating that reduces and/or prevents the oxidation of the coated metal or metal precursor particles. In some examples, the coating is designed to decompose or volatilize at temperatures under the melting point of the nanoparticle. This may help prevent the coating from inhibiting adhesion between the metal or metal precursor particles and the adjacent metal powder build material particles 16. In another example, metal oxide coated nanoparticles are provided with a reducing agent either as part of the particle, as a coating, or applied separately. The reducing agent is activated causing a reduction of the metal oxide and formation of metal connections.

The polymer-free grey part 48 with the metal or metal precursor particles are reorganized within the interstitial spaces of the polymer-free grey part 48 to form metal connections between the metal or metal precursor particles. The metal connections preferentially occupy spaces between the metal powder build material particles 16 due to the high volume to new surface area ratio provided by those locations. However, not every junction need be connected in order to form a solid, consolidated part. There is a random component to which metal powder build material particles 16 get connected together via the metal connections and which do not. Accordingly, there is a threshold below which the weight percentage of metal or metal precursor particles will not provide acceptable strength. In some instances, a part with a lower metal or metal precursor particles loading may be brittle or vulnerable to damage even though it is solid. However, as metal or metal precursor particles tend to be expensive compared with the metal powder build material particles 16, there is a tradeoff between mechanical robustness and the percentage of metal or metal precursor particles used as a percentage of total weight of the part.

Functional parts can be produced with binding fluid compositions or first fluid compositions having from about 0.1 wt % to about 15 wt % metal or metal precursor particles by weight of the final part. Higher loadings of metal or metal precursor particles appear to reduce the temperature needed to obtain consolidation, produce higher densities, and may reduce the shrinkage observed during a subsequent heating/sintering operation. This is consistent with a model where the metal or metal precursor particles are binding the metal powder build material particles 16 together and filling gaps between the metal powder build material particles 16.

Solvent

In some examples, the binder fluid 36, the first fluid, and the second fluid each include liquid vehicles that each include at least one solvent.

In some examples, the solvent acts as a coalescing solvent in the binder fluid 36 and in the second fluid when present with the polymer particles by plasticizing the polymer particles and enhancing the coalescing of the polymer particles upon exposure to heat. In some examples, the liquid vehicle may consist of the polymer particles and the coalescing solvent (with no other components). In these examples, the liquid vehicle consists of the coalescing solvent (with no other components), and the coalescing solvent makes up the balance of the binder fluid 36.

In some examples, the solvent may be lactams, such as 2-pyrrolidinone, 1-(2-hydroxyethyl)-2-pyrrolidone, or combinations thereof. In other examples, the solvent may be a glycol ether or a glycol ether esters, such as tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, or combination thereof. In still other examples, the solvent may be a water-soluble polyhydric alcohol, such as 2-methyl-1,3-propanediol, or combinations thereof. In still other examples, the solvent may be a combination of any of the examples above. In still other examples, the solvent is selected from the group consisting of 2-pyrrolidinone, 1-(2-hydroxyethyl)-2-pyrrolidone, tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, 2-methyl-1,3-propanediol, or combinations thereof.

The solvent may be present in the liquid vehicles in an amount ranging from about 0.1 wt % to about 50 wt % (based upon the total weight of the binder fluid, first fluid, or second fluid). In some examples, greater or lesser amounts of the solvent may be used depending, in part, upon the jetting architecture of the applicator 24.

As used herein, "liquid vehicle" may refer to the liquid fluid in which the polymer particles and/or the metal or metal precursor particles are dispersed. A wide variety of liquid vehicles, including aqueous and non-aqueous vehicles, may be used. In some instances, the liquid vehicle consists of a primary solvent with no other components. In other examples, the liquid vehicle may include other components, depending, in part, upon the applicator 24 that is to be used to dispense the binder fluid or first and second fluids.

The primary solvent may be water or a non-aqueous solvent (e.g., ethanol, acetone, n-methyl pyrrolidone, aliphatic hydrocarbons, or combinations thereof). In some examples, the liquid vehicles consist of the polymer particles and/or the metal or metal precursor particles and the primary solvent (with on other components). In these examples, the primary solvent makes up the balance of the liquid vehicle.

Classes of organic co-solvents that may be used in the water-based liquid vehicles include aliphatic alcohols, aromatic alcohols, diols, glycol ethers, polyglycol ethers, 2-pyrrolidones, caprolactams, formamides, acetamides, glycols, long chain alcohols, or combinations thereof. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, or combinations thereof.

Examples of some suitable co-solvents include water-soluble high-boiling point solvents (i.e., humectants), which have a boiling point of at least 120° C., or higher. Some examples of high-boiling point solvents include 2-pyrrolidone (boiling point of about 245° C.), 2-methyl-1,3-propanediol (boiling point of about 212° C.), and combinations thereof. The co-solvent(s) may be present in the liquid vehicles in a total amount ranging from about 1 wt % to about 50 wt % based upon the total weight of the binder fluid, first fluid, or second fluid, depending upon the jetting architecture of the applicator 24.

In some examples, water is present in the binding fluid 36, first fluid, or second fluid, in an amount of at least about 30 wt %, or at least about 35 wt %, or at least about 40 wt %, or at least about 45 wt %, or at least about 50 wt %, or at least about 55 wt %, or at least about 60 wt %, or at least about 65 wt %, or at least about 70 wt %, or at least about 75 wt %, or at least about 80 wt %, or at least about 85 wt %, or at least about 90 wt % based on the total weight of the binding fluid 36, or the first fluid, or the second fluid.

Additives

Examples of other suitable binder fluid or first and second fluid components include co-solvent(s), surfactant(s), anti-microbial agent(s), anti-kogation agent(s), viscosity modifier(s), pH adjuster(s) and/or sequestering agent(s). The presence of a co-solvent and/or a surfactant in the binder fluid or first and second fluid may assist in obtaining a particular wetting behavior with the metal powder build material 16.

Surfactant(s) may be used to improve the wetting properties and the jettability of the binder fluid or first and second fluid. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 or TERGITOL™ 15-S-7 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the binder fluid or first and second fluid may range from about 0.01 wt % to about 10 wt % based on the total weight of the binder fluid or first or second fluid. In another example, the total amount of surfactant(s) in the binder fluid 36 may range from about 0.5 wt % to about 2.5 wt % based on the total weight of the binder fluid or first or second fluids.

The liquid vehicles may also include antimicrobial agent(s). Suitable antimicrobial agents include biocides and fungicides. Example antimicrobial agents may include the NUOSEPT™ (Troy Corp.), UCARCIDET® (Dow Chemical Co.), ACTICIDE® M20 (Thor), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.). The biocide or antimicrobial may be added in any amount ranging from about 0.05 wt % to about 0.5 wt % (as indicated by regulatory usage levels) with respect to the total weight of the binder fluid or first or second fluids.

An anti-kogation agent may be included in the binder fluid or first and second fluids. Kogation refers to the deposit of dried ink (e.g., binder fluid or first and second fluids) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the binder fluid or first and second fluids may range from greater than 0.20 wt % to about 0.62 wt % based on the total weight of the binder fluid or first and second fluids. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Sequestering agents, such as EDTA (ethylene diamine tetra acetic acid), may be included to eliminate the deleterious effects of heavy metal impurities, and buffer solutions may be used to control the pH of the binder fluid 36. From 0.01 wt % to 2 wt % of each of these components, for example, can be used. Viscosity modifiers and buffers may also be present, as well as other additives known to those skilled in the art to modify properties of the binder fluid 36 as desired. Such additives can be present in amounts ranging from about 0.01 wt % to about 20 wt %.

Unless otherwise stated, any feature described hereinabove can be combined with any example or any other feature described herein.

In describing and claiming the examples disclosed herein, the singular forms "a" "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, so forth. This same applies to ranges reciting a single numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Unless otherwise stated, references herein to "wt %" of a component are to the weight of that component as a percentage of the whole composition comprising that component. For example, references herein to "wt %" of, for example, a solid material such as polyurethane(s) or colorant(s) dispersed in a liquid composition are to the weight percentage of those solids in the composition, and not to the amount of that solid as a percentage of the total non-volatile solids of the composition.

If a standard test is mentioned herein, unless otherwise stated, the version of the test to be referred to is the most recent at the time of filing this patent application.

All amounts disclosed herein and in the examples below are in wt % unless indicated otherwise.

To further illustrate the present disclosure, examples are given herein. It is to be understood that these examples are presented for illustrative reasons and are not to be construed as limiting the scope of the present disclosure.

EXAMPLES

Stainless steel build material particles with diameters between 10 μm and 60 μm were layered with a first fluid including copper oxide nanoparticles (having an average particle diameter of 100 nm) and a second fluid including latex polymer particles. The first fluid and second fluid formulations are shown below in Table 1 and Table 2, respectively. Binders were deposited separately (one at a time), but their deposition rates were the same (single pen pass deposited the same amount of each binder).

In all cases, whether when a single binder fluid or two separate fluids were used, the total deposited binder volume was about 50 g/m$^2$ per powder layer thickness of about 100 μm.

TABLE 1

First Fluid

| Components | wt % |
|---|---|
| 2-methyl-1,3-propanediol | 18.0 |
| 2-pyrollidinone | 34.0 |
| Tergitol ® 15-S-7 | 0.9 |
| Tergitol ® TMN-6 | 0.9 |
| Capstone ® FS-35 | 0.5 |
| Metalon ™ ICI-002HV Inkjettable Copper Ink | 15.0 |
| Acticide ® B20 | 0.15 |
| Water | balance |

TABLE 2

Second Fluid

| Components | wt % |
|---|---|
| 2-methyl-1,3-propanediol | 9.0 |
| 2-pyrollidinone | 16.0 |
| Tergitol ® 15-S-7 | 0.9 |
| Capstone ® FS-35 | 0.5 |
| Acrylic latex | 16.0 |
| Acticide ® B20 | 0.15 |
| Water | balance |

In order to simplify the experiment, the heating in these examples was done with rapid heating xenon (Xe) discharge lamp system capable of raising powder temperature up to point where metal particles can sinter and melt. Material temperature was increased by precisely controlling energy and time of the Xe lamp discharge. Estimated error of the temperature "dialing" in this experiment is about 20° C.-30° C. up to about 500° C.

It is to be understood that other heaters discussed above can be used instead of the Xe lamp.

Example 1

Figure 4:
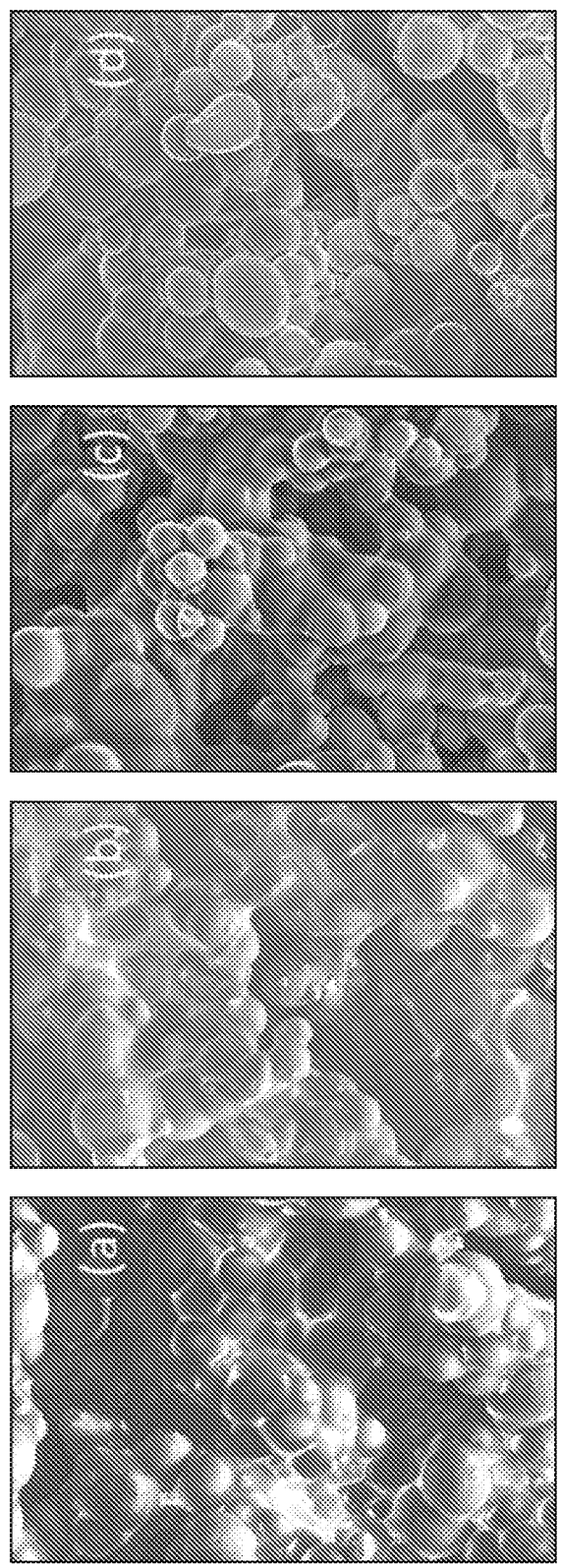
FIGS. 4(a)-(d) show Scanning Electron Microscope (SEM) photographs of an evolution of latex polymer binder fluid deposited on stainless steel powder and then pulse heated through different temperatures.

FIGS. 4(a)-(d) show the evolution of the second fluid deposited on stainless steel powder and then pulse heating the layers. FIG. 4(a) shows stainless steel powder with the second fluid (including latex polymer) as-deposited; FIG. 4(b) shows the film-forming state of the latex polymer on the stainless steel powder after heating at 5.2 J/cm$^2$ (about 190° C.); FIG. 4(c) shows the adhesive state of the latex polymer on the stainless steel powder after further heating at 7.9 J/cm$^2$ (about 250° C.): and FIG. 4(d) shows stainless steel powder with some remaining pyrolyzed latex polymer after further heating at 11.2 J/cm$^2$ (about 300° C.). 30 ms pulse was used.

FIGS. 4(a)-(d) show stainless steel metal powder particles onto which the second fluid was printed. Heating of the particles caused at first slow and then rapid disappearance of binder when heated with Xe pulse energy of around 11 J/cm$^2$ corresponding to temperature of about 300° C.-350° C. which triggers pyrolysis of the latex polymer particles. In this case, due to the thickness of the stainless steel powder layers and second fluid layers, the latex polymer was removed once pyrolysis was triggered.

Example 2

Figure 5:
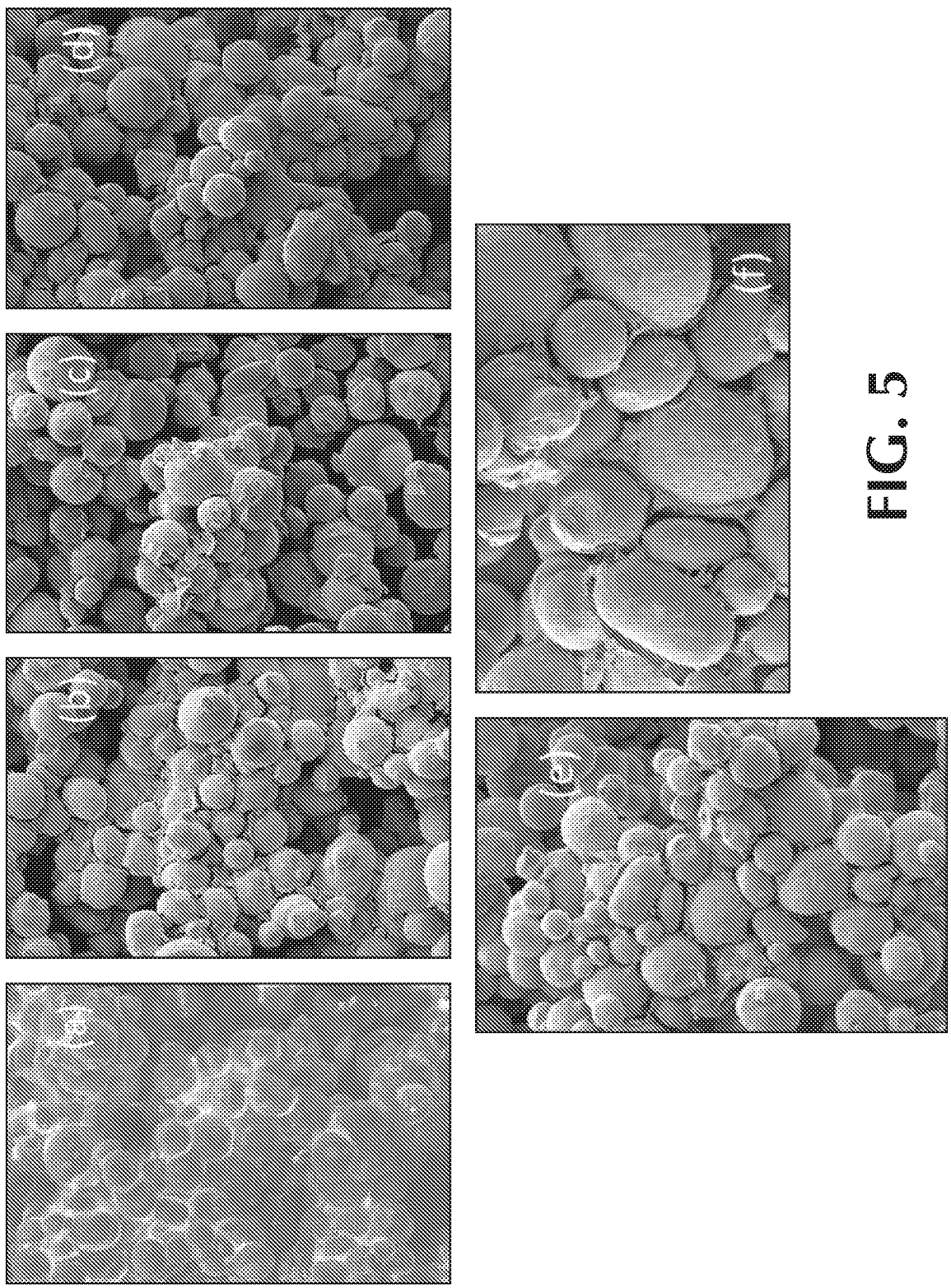
FIGS. 5(a)-(f) show SEM photographs of an evolution of metal oxide binder fluid and latex polymer binder fluid deposited sequentially on stainless steel powder and then pulse heated through different temperatures.

FIGS. 5(a)-(f) show the evolution of the first fluid and the second fluid deposited sequentially. The test sample shown in FIGS. 5(a)-(f) was created by depositing the first and second fluids on stainless steel powder in the following order: layer of the first fluid followed by the second fluid, repeated 3 times. FIG. 5(a) shows stainless steel powder and first and second fluids, as-deposited; FIG. 5(b) shows the layers after heating at 11.3 J/cm$^2$ (about 300° C.); FIG. 5(c) shows the layers after further heating at 15.2 J/cm$^2$ (about 440° C.); FIG. 5(d) shows the layers after further heating at 19.7 J/cm$^2$ (about 650° C.); FIG. 5(e) shows the layers after further heating at 24.8 J/cm$^2$ (about 800° C.). 30 ms pulse was used. FIG. 5(f) shows details of the bonding form in the layers at the highest pulse energy (about 800° C.). Metal connections (from melted copper nanoparticles) connecting the stainless steel powder particles can be seen in FIG. 5(f).

Example 3

Figure 6:
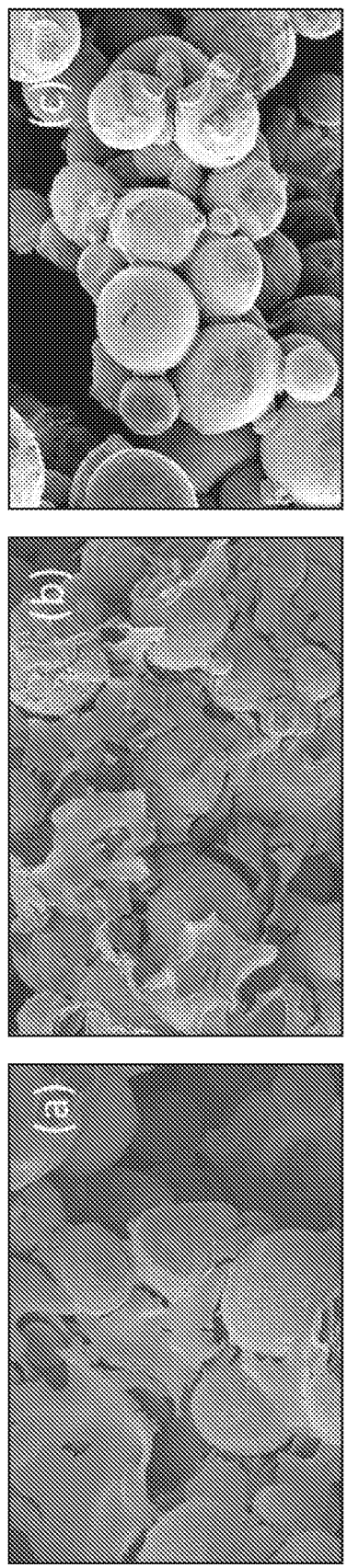
FIGS. 6(a)-(c) show SEM photographs of an evolution of metal oxide binder fluid and latex polymer binder fluid deposited in different order and layers on stainless steel powder and then pulse heated through different temperatures.

FIG. 6(a) shows (the second fluid+the first fluid) repeated 3 times. FIG. 6(b) shows (the first fluid+the second fluid) repeated 3 times. FIG. 6(c) shows the first fluid repeated 3 times followed by the second fluid repeated 2 times.

FIGS. 6(a)-(c) compares fusing of the stainless steel powder particles at temperature above the pyrolysis temperature (below about 300° C.) for the latex polymer. Deposition of the second fluid first appears to form large sheets of copper connecting particles. While in the case of the first fluid being deposited first these sheets are smaller, more frequently broken and likely providing better binding. Without wishing to be bound by theory, the likely reason for the difference between FIG. 6(a) and FIG. 6(b) is related to the removal of latex polymer particles via pyrolysis. Differences can be seen in FIG. 6(c) when layers of copper oxide (first fluid) are deposited first followed by layers of the latex polymer particles (second fluid). Latex polymer particles can pyrolyze when on the top layers (FIG. 6(c)) while the underlying copper oxide layers are reduced to elemental copper forming well defined bridges or metal connections connecting adjacent stainless steel particles.

Figure 7:
FIG. 7 shows a 2500× magnification of FIG. 6(c).

FIG. 7 is a 2500× magnification of FIG. 6(c) showing stainless steel powder particles bound together when several layers of the first fluid are deposited first on the stainless steel powder. Copper forms "necks" or metal connections connecting adjacent stainless steel powder particles. In this case powder was heated to about 450° C.

While several examples have been described in detail, it is to be understood that the disclosed examples may be modified. Therefore, the foregoing description is to be considered non-limiting.

What is claimed is:

1. A printing system for printing a three-dimensional object, the printing system comprising:
   a supply of a first inkjet-printable binding fluid, the first binding fluid including a liquid vehicle and metal or metal precursor particles;
   a supply of a second inkjet-printable binding fluid, the second binding fluid including a second liquid vehicle and latex polymer particles dispersed in the second liquid vehicle, wherein the latex polymer particles have an average particle size of from about 10 nm to about 300 nm, a glass transition temperature (Tg) ranging from about 160° C. to about 200° C., and have a weight average molecular weight ranging from about 10,000 Mw to 300,000 Mw;

a supply of metal powdered build material;

a build material distributor;

a fluid applicator for selectively dispensing the first and second binding fluids, wherein the fluid applicator is a thermal inkjet printhead or a piezoelectric inkjet printhead;

a heat source;

a controller; and a non-transitory computer readable medium having stored thereon computer executable instructions to cause the controller to print the three-dimensional object by:

utilizing the build material distributor and the fluid applicator to iteratively form at least one layer of powdered metal build material having selective application of the first and second binding fluids; and utilizing the heat source to heat the selectively applied first and second binding fluids on the powdered metal build material to form the three-dimensional object.

2. The printing system of claim 1, wherein the powdered metal build material is selected from the group consisting of steels, bronzes, titanium and alloys thereof, aluminum and alloys thereof, nickel and alloys thereof, cobalt and alloys thereof, iron and alloys thereof, nickel cobalt alloys, gold and alloys thereof, silver and alloys thereof, platinum and alloys thereof, copper and alloys thereof, and combinations thereof.

3. The printing system of claim 1, wherein the latex polymer particles are made from (A) a co-polymerizable surfactant selected from the group consisting of polyoxyethylene alkylphenyl ether ammonium sulfate, sodium polyoxyethylene alkylether sulfuric ester, polyoxyethylene styrenated phenyl ether ammonium sulfate, and mixtures thereof, and (B) styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, acetoacetoxyethyl methacrylate, or combinations thereof.

4. The printing system of claim 1, wherein the latex polymer particles are present in the second inkjet-printable binding fluid in an amount ranging from about 2 wt % to about 30 wt % based on a total weight of the second inkjet-printable binding fluid.

5. The printing system of claim 1, wherein the average particle size of the latex polymer particles ranges from about 50 nm to about 300 nm.

6. The printing system of claim 1, wherein the metal or metal precursor particles are selected from the group consisting of metal nanoparticles, metal oxide nanoparticles, metal oxide nanoparticles with a reducing agent, and combinations thereof.

7. The printing system of claim 6, wherein:

the metal or metal precursor particles are the metal oxide nanoparticles, and wherein the metal oxide nanoparticles are oxides of iron, nickel, silver, gold, copper, platinum, cobalt, manganese, vanadium, molybdenum, or combinations thereof; or the metal or metal precursor particles are the metal nanoparticles, and wherein the metal nanoparticles are selected from the group consisting of nickel nanoparticles, silver nanoparticles, gold nanoparticles, platinum nanoparticles, and combinations thereof.

8. The printing system of claim 1, wherein the metal or metal precursor particles have a mean particle diameter of less than about 200 nm.

9. The printing system of claim 1, wherein the second liquid vehicle includes at least one coalescing solvent, and wherein the at least one coalescing solvent is present in the second inkjet-printable binding agent in an amount ranging from about 0.1 to about 50 wt %.

10. The printing system of claim 1, wherein the second inkjet-printable binding fluid has a pH ranging from about 6.5 to about 9.

11. The printing system of claim 1, wherein the second inkjet-printable binding fluid has a viscosity of less than about 10 cps.

12. The printing system of claim 1, wherein the second inkjet-printable binding fluid consists of the second liquid vehicle and the latex polymer particles.

13. The printing system of claim 1, wherein the latex polymer particles made of two different copolymer compositions have a core-shell configuration.

14. A kit for use in the printing system of claim 1, the kit comprising:

the metal powdered build material;

the first inkjet-printable binding fluid; and the second inkjet-printable binding fluid.

15. The kit of claim 14, wherein the latex polymer particles are made from (A) a co-polymerizable surfactant selected from the group consisting of polyoxyethylene alkylphenyl ether ammonium sulfate, sodium polyoxyethylene alkylether sulfuric ester, polyoxyethylene styrenated phenyl ether ammonium sulfate, and mixtures thereof, and (B) styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, acetoacetoxyethyl methacrylate, or combinations thereof.

16. The kit of claim 14, wherein the powered metal build material is selected from the group consisting of steels, bronzes, titanium and alloys thereof, aluminum and alloys thereof, nickel and alloys thereof, cobalt and alloys thereof, iron and alloys thereof, nickel cobalt alloys, gold and alloys thereof, silver and alloys thereof, platinum and alloys thereof, copper and alloys thereof, and combinations thereof.

17. The kit of claim 14, wherein the metal or metal precursor particles are selected from the group consisting of metal nanoparticles, metal oxide nanoparticles, metal oxide nanoparticles with a reducing agent, and combinations thereof.

18. The kit of claim 17, wherein:
the metal or metal precursor particles are the metal oxide nanoparticles, and wherein the metal oxide nanoparticles are oxides of iron, nickel, silver, gold, copper, platinum, cobalt, manganese, vanadium, molybdenum, or combinations thereof; and
the reducing agent is selected from the group consisting of aldehydes, hydrazides, hydrazine, ascorbic acid, reducing saccharides, and combinations thereof.

19. The kit of claim 14, wherein the latex polymer particles are present in the second inkjet-printable binding fluid in an amount ranging from about 2 wt % to about 30 wt % based on a total weight of the second inkjet-printable binding fluid.

20. A method of printing a three-dimensional object utilizing the printing system of claim 1, the method comprising:
(i) by the build material distributor, depositing the metal powder build material in a powder bed;
(ii) based on a three-dimensional object model executable by the controller, selectively applying, via the fluid applicator, the first inkjet-printable binding fluid and the second inkjet-printable binding fluid on the metal powder build material in the powder bed,
(iii) repeating (i) and (ii) at least one time to form the three-dimensional object; and
(iv) by the heating source, heating the powder bed to a temperature of up to about 200° C.

21. The method of claim 20, further comprising heating the three-dimensional object to a temperature of up to about 500° C.

22. The method of claim 21, further comprising heating the three-dimensional object to a sintering temperature of greater than about 500° C.

* * * * *